(12) United States Patent
Figliolia

(10) Patent No.: US 11,455,144 B1
(45) Date of Patent: Sep. 27, 2022

(54) SOFTMAX CALCULATION AND ARCHITECTURE USING A MODIFIED COORDINATE ROTATION DIGITAL COMPUTER (CORDIC) APPROACH

(71) Applicant: Xilinx, Inc., San Jose, CA (US)

(72) Inventor: Tomas Figliolia, San Jose, CA (US)

(73) Assignee: XILINX, INC., San Jose, CA (US)

( * ) Notice: Subject to any disclaimer, the term of this patent is extended or adjusted under 35 U.S.C. 154(b) by 176 days.

(21) Appl. No.: 16/691,379

(22) Filed: Nov. 21, 2019

(51) Int. Cl.
*G06F 7/544* (2006.01)
*G06F 7/485* (2006.01)
(Continued)

(52) U.S. Cl.
CPC .......... *G06F 7/5446* (2013.01); *G06F 7/485* (2013.01); *G06F 7/556* (2013.01); *G06F 17/18* (2013.01)

(58) Field of Classification Search
CPC ........ G06F 7/00–785; G06F 17/10–18; G06N 3/04–049; G06N 3/06–0675; G06N 3/08
See application file for complete search history.

(56) References Cited

U.S. PATENT DOCUMENTS 5,991,788 A 11/1999 Mintzer
8,572,150 B1 10/2013 Dick
(Continued)

OTHER PUBLICATIONS

Massimo Vatalaro, Marco Lanuzza, Felice Crupi, Tatiana Moposita, Lionel Trojman, et al . . . A Low-Voltage, Low-Power Reconfigurable Current-Mode Softmax Circuit for Analog Neural Networks. Electronics, Penton Publishing Inc., 2021, 10 (9), pp. 1004. 10.3390/electronics10091004. hal-03218334 (Year: 2021).*
(Continued)

*Primary Examiner* — Emily E Larocque
*Assistant Examiner* — Carlo Waje
(74) *Attorney, Agent, or Firm* — Patterson + Sheridan, LLP

(57) ABSTRACT

Apparatus and associated methods relate to providing a modified CORDIC approach and implementing the modified CORDIC approach in SoftMax calculation to reduce usage of hardware resources. In an illustrative example, a system may include (a) a first circuit configured to transform each element Vi of an input vector V into $V_i = V_{pi} + k_i \cdot \ln 2$ to generate a second data set, (b) a second circuit configured to perform exponential calculations on the second data set to generate a third data set that has a first mantissa $$\frac{\sum_{j=1}^{n} 2^{k_j} \cdot f_{exp}(V_{pj})}{2^{k_{total}}}$$

and an exponent $K_{total}$, (c) a third circuit configured to perform logarithm calculations to generate a third sub data set that has a second mantissa $$2 f_{ln}\left(\frac{\sum_{j=1}^{n} 2^{k_j} \cdot f_{exp}(V_{pj})}{2^{k_{total}}}\right),$$

and, (d) a fourth circuit configured to perform exponential calculations to generate an output data set that has $$2^{k_i - k_{total}} \cdot f_{exp}(V_{pi} + 2 f_{ln}\left(\frac{\sum_{j=1}^{n} 2^{k_j} \cdot f_{exp}(V_{pj})}{2^{k_{total}}}\right),$$

(Continued)

the output data set may be interpreted as a probability distribution of each element $V_i$ of the input vector V.

13 Claims, 15 Drawing Sheets

(51) Int. Cl.
*G06F 7/556* (2006.01)
*G06F 17/18* (2006.01)

(56) References Cited

U.S. PATENT DOCUMENTS

| | | | | |
|---|---|---|---|---|
| 10,949,498 | B1* | 3/2021 | Enumula | G06F 17/10 |
| 2007/0237255 | A1* | 10/2007 | Riccio | G06F 7/5446 375/295 |
| 2012/0054256 | A1* | 3/2012 | Langhammer | G06F 1/035 708/235 |
| 2016/0335120 | A1 | 11/2016 | Gupta et al. | |
| 2017/0076200 | A1* | 3/2017 | Nasu | G06N 3/0472 |
| 2019/0114534 | A1 | 4/2019 | Teng et al. | |
| 2019/0114555 | A1* | 4/2019 | Akerib | G06F 40/205 |
| 2020/0167402 | A1* | 5/2020 | Newns | G06F 9/3001 |
| 2020/0225913 | A1* | 7/2020 | Chen | G06F 7/548 |
| 2021/0042260 | A1* | 2/2021 | Reinhardt | G06F 15/8061 |
| 2021/0073617 | A1* | 3/2021 | Bazzani | G06F 17/16 |
| 2021/0117155 | A1* | 4/2021 | Vasyltsov | G06F 17/10 |
| 2021/0117815 | A1* | 4/2021 | Creed | G06N 3/04 |
| 2021/0350221 | A1* | 11/2021 | Elenes | G06N 3/0481 |

OTHER PUBLICATIONS

Gaoming Du et al. Efficient Softmax Hardware Architecture for Deep Neural Networks. In Proceedings of the 2019 on Great Lakes Symposium on VLSI (GLSVLSI '19). Association for Computing Machinery, New York, NY, USA, 75-80. DOI:https://doi.org/10.1145/3299874.3317988 (Year: 2019).*
A. Kagalkar and S. Raghuram, "CORDIC Based Implementation of the Softmax Activation Function," 2020 24th International Symposium on VLSI Design and Test(VDAT), 2020, pp. 1-4, doi: 10.1109/VDAT50263.2020.9190498. (Year: 2020).*
I. Kouretas and V. Paliouras, "Simplified Hardware Implementation of the Softmax Activation Function," 2019 8th International Conference on Modern Circuits and Systems Technologies (MOCAST), 2019, pp. 1-4, doi: 10.1109/MOCAST.2019.8741677. (Year: 2019).*
Kouretas, I.; Paliouras, V. Hardware Implementation of a Softmax-Like Function for Deep Learning. Technologies 2020, 8, 46. https://doi.org/10.3390/technologies8030046 (Year: 2020).*
Wang et al. "A High-Speed and Low-Complexity Architecture for Softmax Function in Deep Learning" 2018 IEEE Asia Pacific Conference on Circuits and Systems, pp. 223-226, DOI: 10.1109/APCCAS.2018.8605654 (Year: 2018).*

Yuan "Efficient Hardware Architecture of Softmax Layer in Deep Neural Network" 2017. DOI: 10.1109/SOCC.2016.7905501 (Year: 2017).*
Patterson et al., "Computer Organization and Design: The Hardware/Software Interface", Fifth Edition, 2014. Retrieved from <https://ict.iitk.ac.in/wp-content/uploads/CS422-Computer-Architecture-ComputerOrganizationAndDesign5thEdition2014.pdf> (Year: 2014).*
Tanya Vladimirova, Hans Tiggeler, FPGA Implementation of Sine and Cosine Generators Using the CORDIC Algorithm, retrieved online on Aug. 26, 2019. Retrieved from the Internet <https://pdfs.semanticscholar.org/1a7e/d3becdad14d662af384f460620124a08f6a0.pdf>, 11 pages.
V. Soumya, Raghavendra Shirodkar, A.Prathiba, V.S. Kanchana Bhaaskaran,Design and Implementation of a Generic CORDIC Processor and its Application as a Waveform Generator, Indian Journal of Science and Technology, vol. 8(19), DOI: 10.17485/ijst/2015/v8i19/76856, Aug. 2015, 10 pages.
Leonid Moroz, Volodymyr Samotyy,The CORDIC Method of Calculating the Exponential Function, Technical Transactions, vol. Apr. 2018, Apr. 2018, pp. 119-126.
U.S. Walther, A unified algorithm for elementary functions, AFIPS 71 Spring Proceedings of the May 18-20, 1971, Spring Joint Computer Conference, pp. 379-385., Atlantic City, New Jersey, USA. Hewlett-Packard Company, Palo Alto, California, retrieved online on Aug. 26, 2019. Retrieved from the Internet <https://pdfs.semanticscholar.org/0efd/e1502a5b16ba5929f6c20dc337d33663c6c3.pdf>, Computer History Museum.
Ray Andraka, A survey of CORDIC algorithms for FPGA based computers,retrieved online on Aug. 26, 2019. Retrieved from the Internet <http://www.andraka.com/files/crdcsrvy.pdf>, 10 pages.
Stephen Evanczuk, Get Started with Machine Learning Using Readily Available Hardware and Software, Aug. 29, 2019, retrieved online on Jul. 18, 2019. Retrieved from the Internet <https://www.digikey.com/en/articles/techzone/2018/aug/get-started-machine-learning-hardware-and-software>, 8 pages.
Xiaoyuan Liang, Guiling Wang, A Convolutional Neural Network for Transportation Mode Detection Based on Smartphone Platform, 2017 IEEE 14th International Conference on Mobile Ad Hoc and Sensor Systems (MASS), pp. 338-342. Oct. 22-25, 2017, Orlando, FL USA.
Wikipedia, Multiplication algorithm, retrieved online on Jun. 7, 2019. Retrieved from the Internet <https://en.wikipedia.org/wiki/Multiplication_algorithm>, 13 pages.
Xilinx, Inc., DPU for Convolutional Neural Network v2.0, DPU IP Product Guide, PG338 v2.0, Jun. 7, 2019, 51 pages, San Jose, CA USA.
Xilinx, Inc., VIVADO Design Suite, CORDIC v6.0, LogiCORE IP Product Guide, PG105, Dec. 20, 2017, 66 pages, San Jose, CA USA.
Xilinx, Inc., Nikhil Dhume, Ramakrishnan Srinivasakannan, Parameterizable CORDIC-Based Floating-Point Library Operations, Spartan-6, Virtex-6, 7 Series and Zynq-7000 Devices, XAPP552 v1.0, Jun. 1, 2012, 18 pages, San Jose, CA USA.
Mou Shengmei, Li Zhaogang, a method to calculate exponential/logarithm based on FPGA, Computer Engineering and Applications, 2011,47(33), pp. 59-61.

* cited by examiner

FP addition

| | | | Mantissa | Exp | | Mantissa | Exp | | Mantissa | Exp |
|---|---|---|---|---|---|---|---|---|---|---|
| 37898 | -5 | ⇒ | 37898 | -5 | >> 11 | 18 | 6 | = | 48110 | 6 |
| 48092 | 6 | ⇒ | + 48092 | 6 | = | 48092 | 6 | | | |

| | | | Mantissa | Exp | | Mantissa | Exp | | Mantissa | Exp |
|---|---|---|---|---|---|---|---|---|---|---|
| | | | 48110 | 6 | = | 48110 | 6 | = | 50989 | 6 |
| 46069 | 2 | ⇒ | + 46069 | 2 | >> 4 | 2879 | 6 | | | |

| | | | Mantissa | Exp | | Mantissa | Exp | | Mantissa | Exp |
|---|---|---|---|---|---|---|---|---|---|---|
| | | | 50989 | 6 | = | 50989 | 6 | = | 51002 | 6 |
| 28487 | -5 | ⇒ | + 28487 | -5 | >> 11 | 13 | 6 | | | |

| | | | Mantissa | Exp | | Mantissa | Exp | | Mantissa | Exp |
|---|---|---|---|---|---|---|---|---|---|---|
| | | | 51002 | 6 | = | 51002 | 6 | = | 58049 | 6 |
| 56382 | 3 | ⇒ | + 56382 | 3 | >> 3 | 7047 | 6 | | | |

| | | | Mantissa | Exp | | Mantissa | Exp | | Mantissa | Exp |
|---|---|---|---|---|---|---|---|---|---|---|
| | | | 58049 | 6 | = | 58049 | 6 | = | 59274 | 6 |
| 39208 | 1 | ⇒ | + 39021 | 1 | >> 5 | 1225 | 6 | | | |

| | | | Mantissa | Exp | | Mantissa | Exp | | Mantissa | Exp |
|---|---|---|---|---|---|---|---|---|---|---|
| | | | 59274 | 6 | >>1 | 29637 | 7 | = | 33524 | 8 |
| 37411 | 7 | ⇒ | + 37411 | 7 | = | 37411 | 7 | | | |

| | | | Mantissa | Exp | | Mantissa | Exp | | Mantissa | Exp |
|---|---|---|---|---|---|---|---|---|---|---|
| | | | 33524 | 8 | = | 33524 | 8 | = | 36239 | 8 |
| 43441 | 4 | ⇒ | + 43441 | 4 | >>4 | 2715 | 8 | | | |

| | | | Mantissa | Exp | | Mantissa | Exp | | Mantissa | Exp |
|---|---|---|---|---|---|---|---|---|---|---|
| | | | 36239 | 8 | = | 36239 | 8 | = | 36245 | 8 |
| 25933 | -4 | ⇒ | + 25933 | -4 | >>12 | 6 | 8 | | | |

| | | | Mantissa | Exp | | Mantissa | Exp | | Mantissa | Exp |
|---|---|---|---|---|---|---|---|---|---|---|
| | | | 36245 | 8 | = | 36245 | 8 | = | 40139 | 8 |
| 62317 | 4 | ⇒ | + 62317 | 4 | >>4 | 3894 | 8 | | | |

FIG. 7B

SOFTMAX CALCULATION AND ARCHITECTURE USING A MODIFIED COORDINATE ROTATION DIGITAL COMPUTER (CORDIC) APPROACH

TECHNICAL FIELD

Various embodiments relate generally to neural network processing systems.

BACKGROUND

Machine learning is the science of inducing computing systems to act without being explicitly programmed. Classical machine learning includes various clustering and classification techniques, including K—means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (e.g., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. CNN is well-suited for processing image or video data. Other types of DNNs include recurrent neural network (RNNs), which are well-suited for processing speech and text data.

SUMMARY

Apparatus and associated methods relate to providing a modified Coordinate Rotation Digital Computer (CORDIC) approach and implementing the modified CORDIC approach in SoftMax calculation to reduce the usage of hardware resources. In an illustrative example, a system may include (a) a first circuit configured to transform each element $V_i$ of an input vector V into $V_i = V_{pi} + k_i \cdot \ln 2$ to generate a second data set, (b) a second circuit configured to perform exponential calculations on the second data set to generate a third data set that has a first mantissa $$\frac{\sum_{j=1}^{n} 2^{k_j} \cdot f_{exp}(V_{pj})}{2^{k_{total}}}$$

and an exponent $K_{total}$, (c) a third circuit configured to perform logarithm calculations to generate a third sub data set that has a second mantissa $$2 f_{ln}\left(\frac{\sum_{j=1}^{n} 2^{k_j} \cdot f_{exp}(V_{pj})}{2^{k_{total}}}\right),$$

and, (d) a fourth circuit configured to perform exponential calculations to generate an output data set that has $$2^{k_i - k_{total}} \cdot f_{exp}(V_{pi} + 2 f_{ln}\left(\frac{\sum_{j=1}^{n} 2^{k_j} \cdot f_{exp}(V_{pj})}{2^{k_{total}}}\right),$$

the output data set may be interpreted as a probability distribution of each element $V_i$ of the input vector V.

Various embodiments may achieve one or more advantages. In some embodiments, the modified CORDIC approach may be achieved by avoiding the calculation of multiplication and division. For example, some embodiments may implement the modified CORDIC approach in hardware to reduce hardware resources usage in, for example, silicon area by reducing the usage of multipliers and division circuits. Some embodiments may implement the modified CORDIC approach in software, allowing for simple instructions to take place (allowing simple processors to execute), without the necessity of implementing multiplications or divisions that might take many more clock cycles to execute. Accordingly, the implementation of Soft-Max calculation may be simplified. In some embodiments, the SoftMax calculation with the modified CORDIC approach may be applied in convolutional neural networks to be used in different technical fields. In some embodiments, hardware resources used to implement the CORDIC approach may be shared to further save hardware sources and reduce the cost of silicon area. In some embodiments, hardware resources may be programmed to provide a programmable architecture with different resolutions.

In an exemplary aspect, a system includes (a) a first circuit configured to receive an input vector V representative of a first data set and transform each element Vi of the input vector V into $V_i = V_{pi} + k_i \cdot \ln 2$ to generate a second data set, the second data set comprising a first sub data set that has $V_{pi}$ and a second sub data set that has $k_i$, $-1 \leq V_{pi} \leq 1$, and each $k_i$ is an integer. The system also includes (b) a second circuit configured to receive the second data set from the first circuit and perform exponential calculations on the second data set to generate a third data set, the third data set comprising a third sub data set that has a first mantissa $$V_{total1} = \frac{\sum_{j=1}^{n} 2^{k_j} \cdot f_{exp}(V_{pj})}{2^{k_{total}}}$$

and a fourth sub data set having a first exponent $k_{total}$, $-1 \leq V_{total1} \leq 1$. The system also includes (c) a third circuit configured to receive the third sub data set and perform logarithm calculations on the third sub data set to generate a fifth sub data set that has a second mantissa $$V_{total2} = 2f_{ln}\left(\frac{\sum_{j=1}^{n} 2^{kj} \cdot f_{exp}(V_{pj})}{2^{k_{total}}}\right), -1 \leq V_{total2} \leq 1.$$

The system also includes (d) a fourth circuit configured to receive the fourth sub data set that has the first exponent $k_{total}$, the fifth sub data set that has the second mantissa, and the second data set that has $V_{pi}$ and $k_i$, and perform exponential calculations to generate an output data set that has $$2^{k_i - k_{total}} \cdot f_{exp}\left(V_{pi} + 2f_{ln}\left(\frac{\sum_{j=1}^{n} 2^{kj} \cdot f_{exp}(V_{pj})}{2^{k_{total}}}\right)\right),$$

the output data set is representative of a probability distribution of each element $V_i$ of the input vector V.

In some embodiments, the first circuit may also include (1) a demultiplexer configured to receive each element $V_i$ of the input vector V representative of the first data set, (2) $K_{int}$ transformation circuits commonly coupled to the output of the demultiplexer to perform sequential subtraction of value ln2 to an absolute value of element $V_i$, (3) $K_{int}$ casting circuits, each casting circuit of the $K_{int}$ casting circuits may be coupled to a transformation circuit of the $K_{int}$ transformation circuits, and, (4) a multiplexer coupled to receive outputs from the $K_{int}$ transformation circuits and outputs from the $K_{int}$ casting circuits to generate the first sub data set that has $V_{pi}$ and the second sub data set that has $k_i$.

In some embodiments, the first circuit may also include a data store configured to store the first sub data set that has $V_{pi}$ and the second sub data set that has $k_i$. In some embodiments, the second circuit may also include (1) a first N-stage pipelined CORDIC circuit configured to receive the first sub data set that has $V_{pi}$ and perform exponential calculations on the received $V_{pi}$ to generate a sixth sub data set that has $f_{exp}(V_{pi})$, (2) a delay circuit configured to introduce a delay on the received the second sub data set that has $k_i$ to match a delay introduced by the first N-stage pipelined CORDIC circuit, and (3) a state machine coupled to the first N-stage pipelined CORDIC circuit and the delay circuit to perform operations on the sixth sub data set to make an integer part of $f_{exp}(V_{pi}) \leq 1$. In some embodiments, the operations may also include right shifting $f_{exp}(V_{pi})$ and increasing a corresponding $k_i$ if $f_{exp}(V_{pi}) > 1$.

In some embodiments, the second circuit may also include (4) a floating point adder coupled to the state machine to perform summation on every $f_{exp}(V_{pi})$, and (5) a floating point register coupled to the floating point adder to generate and store the third sub data set and the fourth sub data set. In some embodiments, the third circuit may also include a second N-stage pipelined CORDIC circuit coupled to the floating point register to receive the third sub data set that has the first mantissa $$V_{total1} = \frac{\sum_{j=1}^{n} 2^{kj} \cdot f_{exp}(V_{pj})}{2^{k_{total}}}$$

and perform logarithm calculations on the first mantissa $V_{total1}$ to generate the fifth sub data set that has the second mantissa $$V_{total2} = 2f_{ln}\left(\frac{\sum_{j=1}^{n} 2^{kj} \cdot f_{exp}(V_{pj})}{2^{k_{total}}}\right).$$

In some embodiments, the fourth circuit may also include (1) a summing circuit configured to retrieve the first sub data set that has $V_{pi}$ from the data store and retrieve the fifth sub data set that has the second mantissa $V_{total2}$ from the floating point register and generate a seventh sub data set, (2) a subtracting circuit configured to retrieve the second sub data set that has $k_i$ from memory and retrieve the fourth data set that has the exponent $K_{total}$ from the floating point register and subtract the exponent $K_{total}$ from $k_i$ to generate an eighth sub data set, (3) a N-stage pipelined CORDIC circuit coupled to the output of the summing circuit and configured to perform exponential calculations on the seventh sub data set to generate a ninth sub data set that has $$f_{exp}\left(V_{pi} + 2f_{ln}\left(\frac{\sum_{j=1}^{n} 2^{kj} \cdot f_{exp}(V_{pj})}{2^{k_{total}}}\right)\right),$$

(4) a second delay path configured to introduce a delay on the received eighth sub data set, and, (5) a state machine coupled to the N-stage pipelined CORDIC circuit and the delay path to perform operations on the ninth sub data set to make an integer part of $$f_{exp}\left(V_{pi} + 2f_{ln}\left(\frac{\sum_{j=1}^{n} 2^{kj} \cdot f_{exp}(V_{pj})}{2^{k_{total}}}\right)\right),$$

$\leq 1$ and generate the output data set.

In another exemplary aspect, a system includes a processing engine and a data storage device coupled to the processing engine and containing a program of instructions that, when executed by the processing engine, cause the processing engine to perform operations to conduct SoftMax calculation, the operations includes (a) receiving an input vector V representative of a first data set and transforming each element $V_i$ of the input vector V into $V_i = V_{pi} + k_i \cdot \ln 2$ to generate a second data set, the second data set comprising a first sub data set that has $V_{pi}$ and a second sub data set that has $k_i$, $-1 \leq V_{pi} \leq 1$, and $k_i$ is an integer, (b) performing exponential calculations on the second data set to generate a third data set, the third data set comprising a third sub data set that has a first mantissa $$V_{total1} = 2f_{ln}\frac{\sum_{j=1}^{n} 2^{kj} \cdot f_{exp}(V_{pj})}{2^{k_{total}}}$$

and a fourth sub data set having a first exponent $k_{total}$, $-1 \le V_{total} \le 1$, (c) performing logarithm calculations on third sub data set (225a) to generate a fifth sub data set that has a second mantissa $$V_{total2} = 2f_{ln}\left(\frac{\sum_{j=1}^{n} 2^{kj} \cdot f_{exp}(V_{pj})}{2^{k_{total}}}\right),$$

and, (d) receiving the fourth sub data set that has the first exponent $k_{total}$, the fifth sub data set that has the second mantissa, and the second data set that has $V_{pi}$ and $k_i$, and performing exponential calculations to generate an output data set that has $$2^{k_i - k_{total}} \cdot f_{exp}(V_{pi} + 2f_{ln}\left(\frac{\sum_{j=1}^{n} 2^{kj} \cdot f_{exp}(V_{pj})}{2^{k_{total}}}\right),$$

the output data set is representative of a probability distribution of each element $V_i$ of the input vector V.

In some embodiments, the operations may also include (a1) performing sequential subtraction of value ln2 to an absolute value of element $V_i$. In some embodiments, the operations may also include storing the first sub data set that has $V_{pi}$ and storing the second sub data set that has $k_i$ in the data storage device. In some embodiments, the operations may also include storing the first sub data set that has $V_{pi}$ and storing the second sub data set that has $k_i$ in memory.

In some embodiments, the operations may also include (b1) performing exponential calculations on the received first sub data set that has $V_{pi}$ to generate a sixth sub data set that has $f_{exp}(V_{pi})$ and (b2) if $f_{exp}(V_{pi}) > 1$, right shifting $f_{exp}(V_{pi})$ and increasing a corresponding $k_i$ to make an integer part of $f_{exp}(V_{pi}) \le 1$.

In some embodiments, the operations may also include (b3) performing summation on every $f_{exp}(V_{pj})$, and, (b4) generating and storing the third sub data set and the fourth sub data set. In some embodiments, the operations may also include (c1) retrieving the third sub data set that has the first mantissa $$V_{total1} = \frac{\sum_{j=1}^{n} 2^{kj} \cdot f_{exp}(V_{pj})}{2^{k_{total}}}$$

and performing logarithm calculations on the first mantissa $V_{total1}$ to generate the fifth sub data set that has the second mantissa $$V_{total2} = 2f_{ln}\left(\frac{\sum_{j=1}^{n} 2^{kj} \cdot f_{exp}(V_{pj})}{2^{k_{total}}}\right).$$

In another exemplary aspect, a method includes (a) receiving, by a first circuit, an input vector V representative of a first data set and transforming each element $V_i$ of the input vector V into $V_i = V_{pi} + k_i \cdot \ln 2$ to generate a second data set, the second data set comprising a first sub data set that has $V_{pi}$ and a second sub data set that has $k_i$, $-1 \le V_{pi} \le 1$, and $k_i$ is an integer, (b) receiving, by a second circuit, the second data set from the first circuit and performing exponential calculations on the second data set to generate a third data set, the third data set comprising a third sub data set that has a first mantissa $$V_{total1} = \frac{\sum_{j=1}^{n} 2^{kj} \cdot f_{exp}(V_{pj})}{2^{k_{total}}}$$

and a fourth sub data set having a first exponent $k_{total}$, $-1 \le V_{total} \le 1$, (c) receiving, by a third circuit the third sub data set, and performing logarithm calculations on third sub data set to generate a fifth sub data set that has a second mantissa $$V_{total2} = 2f_{ln}\left(\frac{\sum_{j=1}^{n} 2^{kj} \cdot f_{exp}(V_{pj})}{2^{k_{total}}}\right),$$

and, (d) receiving, by a fourth circuit, the fourth sub data set that has the first exponent $k_{total}$, the fifth sub data set that has the second mantissa, and the second data set that has $V_{pi}$ and $k_i$, and performing exponential calculations to generate an output data set that has $$2^{k_i - k_{total}} \cdot f_{exp}(V_{pi} + 2f_{ln}\left(\frac{\sum_{j=1}^{n} 2^{kj} \cdot f_{exp}(V_{pj})}{2^{k_{total}}}\right),$$

the output data set is representative of a probability distribution of each element $V_i$ of the input vector V.

In some embodiments, the method may also include (a1) receiving, by a demultiplexer, each element $V_i$ of the input vector V representative of the first data set, and (a2) performing, by $K_{int}$ transformation circuits commonly coupled to the output of the demultiplexer, sequential subtraction of value ln2 to an absolute value of element $V_i$. In some embodiments, the method may also include (b1) performing exponential calculations on the received first sub data set that has $V_{pi}$ to generate a sixth sub data set that has $f_{exp}(V_{pi})$, and, (b2) if $f_{exp}(V_{pi}) > 1$, right shifting $f_{exp}(V_{pi})$ and increasing a corresponding $k_i$ to make an integer part of $f_{exp}(V_{pi}) \le 1$.

In some embodiments, the method may also include (b3) performing summation on every $f_{exp}(V_{pi})$, and, (b4) generating and storing the third sub data set and the fourth sub data set. In some embodiments, the method may also include (c1) retrieving the third sub data set that has the first mantissa $$V_{total1} = \frac{\sum_{j=1}^{n} 2^{kj} \cdot f_{exp}(V_{pj})}{2^{k_{total}}}$$

and performing logarithm calculations on the first mantissa $V_{total1}$ to generate the fifth sub data set that has the second mantissa $$V_{total2} = 2f_{ln}\left(\frac{\sum_{j=1}^{n} 2^{kj} \cdot f_{exp}(V_{pj})}{2^{k_{total}}}\right).$$

The details of various embodiments are set forth in the accompanying drawings and the description below. Other features and advantages will be apparent from the description and drawings, and from the claims.

BRIEF DESCRIPTION OF THE DRAWINGS

FIG. 7B depicts an exemplary method to calculate mantissa and exponent.

Like reference symbols in the various drawings indicate like elements.

DETAILED DESCRIPTION OF ILLUSTRATIVE EMBODIMENTS

Apparatus and associated methods relate to providing a modified CORDIC approach and implementing the modified CORDIC approach in SoftMax calculation to reduce usage of hardware resources. In an illustrative example, a system may include (a) a first circuit configured to transform each element $V_i$ of an input vector V into $V_i=V_{pi}+k_i \cdot \ln 2$ to generate a second data set, (b) a second circuit configured to perform exponential calculations on the second data set to generate a third data set that has a first mantissa $$\frac{\sum_{j=1}^{n} 2^{kj} \cdot f_{exp}(V_{pj})}{2^{k_{total}}}$$

and an exponent $K_{total}$, (c) a third circuit configured to perform logarithm calculations to generate a third sub data set that has a second mantissa $$2f_{ln}\left(\frac{\sum_{j=1}^{n} 2^{kj} \cdot f_{exp}(V_{pj})}{2^{k_{total}}}\right),$$

and, (d) a fourth circuit configured to perform exponential calculations to generate an output data set that has $$2^{k_i - k_{total}} \cdot f_{exp}\left(V_{pi} + 2f_{ln}\left(\frac{\sum_{j=1}^{n} 2^{kj} \cdot f_{exp}(V_{pj})}{2^{k_{total}}}\right)\right),$$

the output data set may be interpreted as a probability distribution of each element $V_i$ of the input vector V.

To aid understanding, this document is organized as follows. First, an exemplary platform (e.g., an FPGA) suitable to perform SoftMax calculation is briefly introduced with reference to FIG. 1. Second, with reference to FIGS. 2-6, the discussion turns to exemplary embodiments that illustrate architectures of a modified CORDIC engine used to perform the SoftMax calculation. Then, with reference to FIGS. 7A-8B, systems and methods to configure and operate the modified CORDIC engine are discussed. Finally, with reference to FIG. 9, another exemplary platform (e.g., a system-on-Chip (SOC)) suitable to perform SoftMax calculation is briefly introduced.

Figure 1:
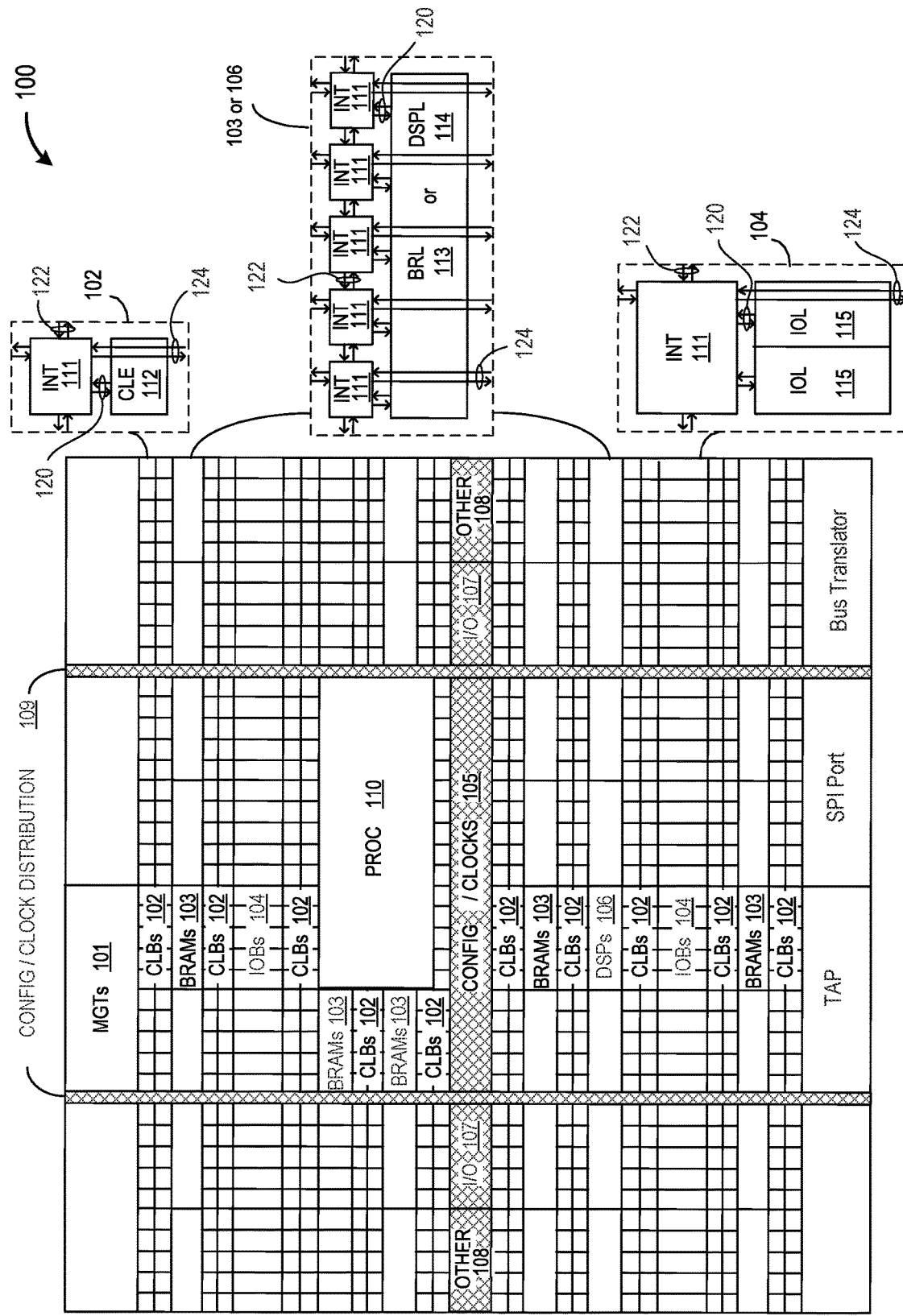
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An 10B 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

Field programmable gate arrays (FPGAs) have been used to implement circuits that can perform different functions. A subset of artificial intelligence (AI), machine learning (ML) encompasses a wide range of methods and algorithms. FPGAs may serve as the hardware platform for implementing machine learning algorithms.

Some matrices may allow an input vector to be rotated by a certain angle (I). In the $R^2$ case, the matrix that may rotates counterclockwise an input vector by is:

$$R_\phi = \begin{bmatrix} \cos\phi & -\sin\phi \\ \sin\phi & \cos\phi \end{bmatrix} \tag{1}$$

One exemplary hyperbolic rotation matrix in the $R^2$ case may be:

$$\begin{bmatrix} x' \\ y' \end{bmatrix} = R_{hyp\phi}\begin{bmatrix} x \\ y \end{bmatrix} = \begin{bmatrix} \cosh\phi & \sinh\phi \\ \sinh\phi & \cosh\phi \end{bmatrix} \times \begin{bmatrix} x \\ y \end{bmatrix}$$

$$x' = x \cdot \cosh\phi + y \cdot \sinh\phi \tag{2a}$$

$$y' = x \cdot \sinh\phi + y \cdot \cosh\phi \tag{2b}$$

For an input vector $$\begin{bmatrix} x \\ y \end{bmatrix} = \begin{cases} x = \cosh\Phi = \dfrac{e^\Phi + e^{-\Phi}}{2} \\ y = \sinh\Phi = \dfrac{e^\Phi - e^{-\Phi}}{2} \end{cases} \tag{3}$$

when hyperbolically rotated by $\phi$, the input vector may become:

$$x' = \cosh\phi \cdot \cosh\Phi + \sinh\Phi \cdot \sinh\Phi = \tag{4}$$
$$\frac{e^\phi + e^{-\phi}}{2} \cdot \frac{e^\Phi + e^{-\Phi}}{2} + \frac{e^\phi - e^{-\phi}}{2} \cdot \frac{e^\Phi - e^{-\Phi}}{2} =$$
$$\frac{e^{\phi+\Phi}}{2} + \frac{e^{-(\phi+\Phi)}}{2} = \cosh(\phi + \Phi)$$

$$y' = \sinh\phi \cdot \cosh\Phi + \cosh\phi \cdot \sinh\Phi = \tag{5}$$
$$\frac{e^\phi - e^{-\phi}}{2} \cdot \frac{e^\Phi + e^{-\Phi}}{2} + \frac{e^\phi + e^{-\phi}}{2} \cdot \frac{e^\Phi - e^{-\Phi}}{2} =$$
$$\frac{e^{\phi+\Phi}}{2} - \frac{e^{-(\phi+\Phi)}}{2} = \sinh(\phi + \Phi)$$

Equation (2a) and equation (2b) may also be rewrote:

$$x' = x \cdot \cosh\phi + y \cdot \sinh\phi \quad (6)$$
$$= \cosh\phi \, (x + y \cdot \tanh\phi)$$

$$y' = x \cdot \sinh\phi + y \cdot \cosh\phi \quad (7)$$
$$= \cosh\phi \, (y + x \cdot \tanh\phi)$$

As matrix $R_{hyp\phi}$ may rotate by any angle $\phi$, the rotation may be decomposed into more elementary rotations $\phi_i$, with $i \in \mathbb{N}$. When there is a sequence $d_i$ and $\phi_i$, $d_i \in \{-1, 1\}$, the following iterative equations may converge to a desired $\phi$ rotation:

$$x_{i+1} = \cosh\phi_i \cdot (x_i + y_i \cdot d_i \cdot \tanh\phi_i) \quad (8)$$
$$y_{i+1} = \cosh\phi_i \cdot (y_i + x_i \cdot d_i \cdot \tanh\phi_i)$$
$$z_{i+1} = z_i - d_i \cdot \phi_i$$

$(x_{i+1}, y_{i+1})$ may converge to the (x, y) coordinates of an input vector $(x_0, Y_0)$ that has been rotated clockwise or counterclockwise according to the $d_i$ values, with elementary rotations determined by the sequence $\phi_i$. If the input vector will be rotated by $z_0$, then the equation (8) may be used to determine if $d_i$ is 1 or −1. If at a certain iteration, $z_i$ is negative, then $d_i=-1$. If $z_i$ is positive, then $d_i=1$. Different $d_i$ values may make the value in z converge to 0 as more iterations are added. In some embodiments, z may be not the one desired to converge to 0, but x or y. For example, if y is selected to converge to 0, then $d_i$ may take values according to the current value of $y_i$. For example, $d_i$ may be chose to be −1 when $y_i$ is positive, which may make the second iterative equation in the equation (8) converge to 0. Then, equation (6) and equation (7) may become:

$$x = \cosh\left(a\tanh\left(-\frac{y_0}{x_0}\right)\right) \cdot \left(x_0 + y_0 \cdot a\tanh\left(-\frac{y_0}{x_0}\right)\right) \quad (9)$$
$$= \frac{1}{\sqrt{1-(y_0/x_0)^2}} \cdot (x_0 - y_0^2/x_0) = \sqrt{x_0^2 - y_0^2}$$

$$y = 0 \quad (10)$$

$$z = z_0 + a\tanh\left(\frac{y_0}{x_0}\right) \quad (11)$$

Two different modes can be derived from these iterative equations. A first mode, Rotation Mode, makes $z \to 0$. A second mode, Vectoring Mode, makes $y \to 0$ or $x \to 0$. And the iterative equations (8) may be then rewritten:

$$x_{i+1} = x_i + y_i \cdot d_i \cdot f(i)$$
$$y_{i+1} = y_i + x_i \cdot d_i \cdot f(i)$$
$$z_{i+1} = z_i - d_i \cdot a\tanh(f(i))$$

In Rotation Mode Convergence:

$$x_n = A_n^{-1} \cdot (x_0 \cdot \cos h(z_0) + y_0 \cdot \sin h(z_0))$$
$$y_n = A_n^{-1} \cdot (y_0 \cdot \cos h(z_0) + x_0 \cdot \sin h(z_0))$$
$$z_n = 0$$

$$A_n = \prod_{i=1}^{n} \cosh\phi_i \quad (12)$$

Rule: $d_i = -1$, when $z_i < 0$; otherwise $d_i = 1$

Rule: $d_i = -1$, when $z_i < 0$; otherwise $d_i = 1$ \quad (12)

In Vectoring Mode Convergence:

$$x_n = A_n^{-1} \cdot \sqrt{x_0^2 - y_0^2}$$
$$y_n = 0$$
$$z_n = z_0 + a\tanh(y_0/x_0)$$

$y_n = 0$ $Z_n = Z_0 + a\tan h(y_0/x_0)$

Rule: $d_i = -1$, when $y_i > 0$; otherwise $d_i = 1$

In iterative equations (12), $\tan h\phi_i$ is replaced by f(i), and $\phi_i = a\tan h(f(i))$. This modification only generates the elementary $\phi_i$ angles using a chosen f(i) sequence and does not change the convergence of the algorithm. The f(i) sequence may have particular characteristics to make the iterative algorithm work. In order to make the iterative algorithm work, any choice $\phi$ of may be represented as $$\sum_{i=1}^{+\infty} d_i \cdot \phi_i, \quad (13)$$

for a particular range:

$$\phi \in \left[ -\sum_{i=1}^{+\infty} \phi_i ; \sum_{i=1}^{+\infty} \phi_i \right]$$

The boundaries for $\phi$'s input range may represent the choice of all −1 s or 1s for the $d_i$ sequence. A first condition over sequence $\phi_i$ is that $$\sum_{i=1}^{+\infty} \phi_i$$

converge to provide input boundaries.

$$2 \cdot \sum_{i=1}^{+\infty} d_i \cdot \phi_i = 2 \cdot \sum_{i=1}^{+\infty} a\tanh f(i) = \quad (14)$$

$$\sum_{i=1}^{+\infty} \ln\left(\frac{1+f(i)}{1-f(i)}\right) \leq \sum_{i=1}^{+\infty} \left(\frac{1+f(i)}{1-f(i)}\right) - 1 = \sum_{i=1}^{+\infty} \frac{2 \cdot f(i)}{1-f(i)}$$

Because of the logarithm calculation, a condition needed for $$f(i) \text{ is } \frac{1+f(i)}{1-f(i)} > 0.$$

Two cases may be possible: (a) both (1+f(i)) and (1−f(i)) are negative, which is incompatible; or (b) both (1+f(i)) and (1−f(i)) are positive, which is compatible. Thus, sequence f(i) may be bounded −1<f(i)<1. By using this condition over f(i), and knowing that f(i) needs to converge to 0 for i→∞, using the limit comparison theorem, $$\sum_{i=1}^{+\infty} \frac{2 \cdot f(i)}{1-f(i)}$$

is bounded, as long as $$\sum_{i=1}^{+\infty} f(i)$$

converges. From equation 14, is concluded that: if −1<f(i)<1 and $$\sum_{i=1}^{+\infty} f(i)$$

converges, then $$\sum_{i=1}^{+\infty} \frac{2 \cdot f(i)}{1-f(i)}$$

will converge. Accordingly, 2·

$$\sum_{i=1}^{+\infty} d_i \cdot \phi_i$$

will converge. The first condition may be concluded as:

$$\sum_{i=1}^{+\infty} \phi_i$$

needs to converge, which will happen if $$\sum_{i=1}^{+\infty} f(i)$$

converges, with −1<f(i)<1, ∀i.

For iteration (k−1) in Rotation Mode, if at the iteration, the algorithm has already reached a desired angle ϕ, then the choice of the remaining $d_i$ sequence has to be so that $$\sum_{i=k}^{+\infty} d_i \cdot \phi_i = 0.$$

If this condition is not held, then the algorithm may not be able to reach the target rotation. There will be a sequence $d_i$, for i={k, k+1, k+2, . . . }, so that $$\phi_{k-1} = \sum_{i=k}^{+\infty} d_i \cdot \phi_i = \sum_{i=k}^{+\infty} \phi_i - 2 \cdot \sum_{\forall i \geq k, s.t. d_i = -1} \phi_i \qquad (16)$$

In some embodiments, when the iterative algorithm is finally mapped into hardware, a more relaxed condition may be that at least the summation of all of the $\phi_i$ angles for i≥k will be greater than $\phi_{k-1}$.

A second condition to make the iterative algorithm to work is any element in sequence $\phi_i$ will be equal or lower than the summation of the remaining $\phi_i$ values. That is:

$$\phi_k \leq \sum_{i=k+1}^{+\infty} \phi_i, \forall k \in N.$$

If the iterative algorithm converges, then all of the subsequences representing the distance between the target angle and the current angle in the algorithm will converge to 0. When a condition $\phi_n > \phi_{n+1}$ is applied, for n>c, with c being a finite constant, there will be a value k such that from iteration k−1 to k, the iteration may always get closer to the target ϕ. The iterative algorithm may be divided into two sequences, one for which i is odd, and the other one for which i is even. For both cases, the subsequences representing the distance to the target ϕ may both converge to 0. When considering $\phi_n > \phi_{n+1}$, for n>c, with c∈N, and applying f (i):

$$\ln\left(\frac{1+f(n)}{1-f(n)}\right) > \ln\left(\frac{1+f(n+1)}{1-f(n+1)}\right) \qquad (17)$$

$$(1-f(n+1)) \cdot (1+f(n)) > (1+f(n+1)) \cdot (1-f(n)) \Rightarrow$$

$$f(n) > f(n+1)$$

A third condition to make the iterative algorithm to work is that there has to be a value c, for which $\phi_n > \phi_{n+1}$ when n>c, with c∈N. This is equivalent to ask that there is a value c∈N, for which f(n)>f(n+1), when n>c. For the first condition and the third condition, the condition on $\phi_n$ may be translated to the condition on f(i). For the second condition, a particular sequence f(i) may be tested to see whether the second condition is satisfied in the $\phi_i$ domain.

CORDIC (Coordinate Rotation Digital Computer), is a simple and efficient algorithm to calculate hyperbolic and trigonometric functions. For CORDIC sequences, in some embodiments, f(i) may be selected to be $2^{-i}$ (original CORDIC f(i)=$2^{-i}$ sequence). This sequence may satisfy the first condition and the third condition easily, as $$\sum_{i=i}^{+\infty} 2^{-i} = 1,$$

and $2^{-n} > 2^{-(n+1)}$. Whether this sequence satisfies the second condition may be checked:

$$\phi_i = a\tanh(f(i)) \Rightarrow \sum_{i=k}^{+\infty} \phi_i = \sum_{i=k}^{+\infty} a\tanh(f(i)) \quad (18)$$

Taylor expansion around 0 for at atanh $$\mathrm{atanh}(x) \text{ is } \sum_{n=0}^{+\infty} \frac{x^{2n+1}}{2n+1},$$

so $$\sum_{i=k}^{+\infty} \phi_i = \sum_{i=k}^{+\infty} a\tanh(f(i)) = \sum_{i=k}^{+\infty} \sum_{n=0}^{+\infty} \frac{f(i)^{2n+1}}{2n+1} \quad (19a)$$

$$= \sum_{n=0}^{+\infty} \frac{1}{2n+1} \left( \sum_{i=k}^{+\infty} f(i)^{2n+1} \right)$$

$$\sum_{i=k}^{+\infty} x^i = \frac{x^k}{1-x}, |x| < 1,$$

the equation (19a) may be transformed to:

$$\sum_{i=k}^{+\infty} \phi_i = \sum_{n=0}^{+\infty} \frac{1}{2n+1} \cdot \frac{2^{-k(2n+1)}}{1 - 2^{-(2n+1)}} \quad (19b)$$

$$\phi_{k-1} - \sum_{i=k}^{+\infty} \phi_i = \sum_{n=0}^{+\infty} \frac{1}{2n+1} \cdot 2^{-(k-1)(2n+1)} - \sum_{n=0}^{+\infty} \frac{1}{2n+1} \cdot \frac{2^{-k(2n+1)}}{1 - 2^{-(2n+1)}} \quad (20)$$

$$= \sum_{n=0}^{+\infty} \frac{1}{2n+1} \cdot 2^{-k(2n+1)} \cdot \left( 2^{(2n+1)} - \frac{1}{1 - 2^{-(2n+1)}} \right)$$

As term $2^{-k(2n+1)} > 0$, then term $$2^{(2n+1)} - \frac{1}{1 - 2^{-(2n+1)}}$$

should be negative which only happens if $2^{2n} < 1$ (21), which is not possible. Thus, original CORDIC $f(i) = 2^{-i}$ sequence is not satisfying the second condition.

In Rotation mode, if $x_0 = y_0 = 1$, then:

$$x_n = y_n = A_n^{-1}(1 \cdot \cosh(z_0) + 1 \cdot \sinh(z_0)) \quad (22)$$

$$= A_n^{-1} \left( \frac{e^{z_0} + e^{-z_0}}{2} + \frac{e^{z_0} - e^{-z_0}}{2} \right) = A_n^{-1} \cdot e^{z_0}$$

This result shows that in Rotation mode, if $x_0 = y_0 = 1$, then both $x_n$ and $y_n$ converge to a value proportional to $e^{z_0}$.

For the case of Vectoring Mode, if $z_0 = 0$, then:

$$z_n = 0 + a\tanh(y_0/x_0) = \frac{1}{2} \ln\left( \frac{y_0/x_0 + 1}{y_0/x_0 - 1} \right) = \frac{1}{2} \ln\left( \frac{y_0 + x_0}{y_0 - x_0} \right) \quad (23)$$

And, if $x_0 = \phi + 1$, and $y_0 = \phi - 1$, then: $z_n = a\tanh\left( \frac{\phi - 1}{\phi + 1} \right) = \frac{1}{2} \ln \phi \quad (24)$ Thus, $z_n$ will actually converge to a value that is proportional to a logarithmic value.

In one example, f(i) sequence may be:

$$f(i) = \frac{1}{2}, \frac{1}{4} + \frac{1}{8}, \frac{1}{4}, \frac{1}{8} + \frac{1}{16}, \frac{1}{8}, \frac{1}{16} + \frac{1}{32}, \frac{1}{16}, \frac{1}{32} + \frac{1}{64}, \frac{1}{32} \ldots \quad (25a)$$

$$i = 1, 2, 3, 4, 5, 6, 7, 8, 9, \ldots \quad (25b)$$

The values in equation (25a) shows that additional values $$\left( \text{e.g., } \frac{1}{4} + \frac{1}{8}, \frac{1}{8} + \frac{1}{16}, \frac{1}{16} + \frac{1}{32}, \frac{1}{32} + \frac{1}{64} \ldots \right)$$

have been added to the original CORDIC $f(i) = 2^{-i}$ sequence. In the original CORDIC f(i) sequence is $$\frac{1}{2}, \frac{1}{4}, \frac{1}{8}, \frac{1}{16}, \frac{1}{32}$$

etc. in the modified cordic version, there is a change to that sequence. For example, the modified f(i) sequence shown in Equation 25a. In this sequence, intermediate values are used, for example $$\left( \frac{1}{4} + \frac{1}{8} \right).$$

In order to achieve a multiplication by this value, the hardware resources are incremented with respect to the original CORDIC implementation. The modified CORDIC engine may be implemented with significantly reduced hardware resources. The modified CORDIC sequence in equation (25a) can be shown to satisfy the second condition. The exponential function is computed in Rotation mode, and the desired input to the exponential function may be represented as $$\sum_{i=k}^{+\infty} d_i \cdot \phi_i.$$

For example, to calculate the exponential function in $[-a; a]$, the condition is $$\sum_{i=k}^{+\infty} \phi_i \geq a. \quad (26)$$

The logarithm function is computed in Vectoring mode, and the desired resulted may appear in $z_n$ in equation (12) as may be represented as ½ $\ln\phi$. Then, all values ½ $\ln\phi$ may be representable as $$\sum_{i=k}^{+\infty} d_i \cdot \phi_i.$$

The supported input range for the logarithm calculation may be achieved.

$$-\sum_{i=k}^{+\infty} \phi_i \leq \frac{1}{2}\ln\phi \leq \sum_{i=k}^{+\infty} \phi_i \quad (27)$$

$$e^{-2\sum_{i=k}^{+\infty} \phi_i} \leq \phi \leq e^{2\sum_{i=k}^{+\infty} \phi_i}$$

Figure 2:
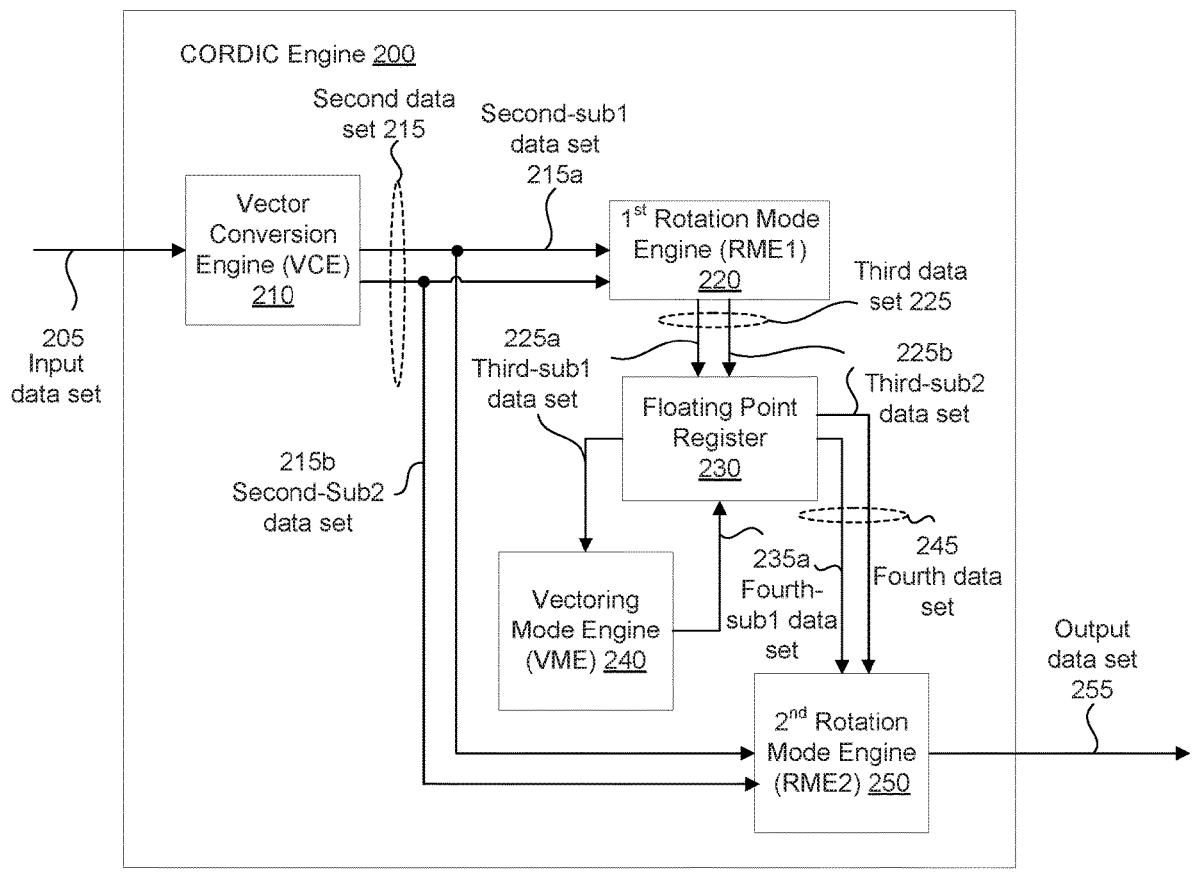
FIG. 2 depicts an exemplary modified Coordinate Rotation Digital Computer (CORDIC) engine implemented in a SoftMax layer of a convolutional neural network.

FIG. 2 depicts an exemplary modified CORDIC engine implemented in a SoftMax layer of a convolutional neural network. SoftMax is a function that may be used at the output of neural networks (e.g., Convolutional neural networks (CNNs)), and allows for predictions to be non-linearly scaled in such a way that large numbers may be amplified, and small numbers may be attenuated. The equation for SoftMax is:

$$SoftMax(\vec{V}) = \frac{(e^{V_1}, e^{V_2}, \ldots, e^{V_n})}{\sum_{j=1}^{n} e^{V_j}} \quad (28)$$

For a single element in the equation (28), $$SoftMax_i(\vec{V}) = \frac{e^{V_i}}{\sum_{j=1}^{n} e^{V_j}} \quad (29)$$

Values $V_i$ may be assigned any value. In some embodiments, the integer part of $V_i$ may be constrained to $[-2^{K_{int}-1}; 2^{K_{int}-1}]$, which means $K_{int}$ bits may be assigned to represent the signed integer part of $V_i$, with $i \in \{1, 2, \ldots, n\}$.

A modified CORDIC engine 200 may be used to receive an input vector V representative of an input data set 205 and perform SoftMax computation on the input data set 205 to obtain an output data set 255 that may be interpreted as a probability distribution of each element $V_i$ in the input vector V. In some embodiments, the modified CORDIC engine 200 may also include a data store configured to store the data set 205. In order to compute SoftMax using the Rotation mode and the Vectoring mode of the modified-CORDIC method, which allows to compute both the exponential and logarithm function, every value $V_i$ in $\vec{V}$ may be transformed to a new representation:

$$V_i = V_{pi} + k_i \cdot \ln 2, \text{ with } V_{pi} \in (-1,1), k_i \in \mathbb{Z} \quad (30)$$

As $V_i \in [-2^{K_{int}-1}; 2^{K_{int}-1}]$, a binary search may be performed with values:

$$2^{K_{int}-1} \cdot \ln 2, 2^{K_{int}-2} \cdot \ln 2, 2^{K_{int}-3} \cdot \ln 2, \ldots, 1 \cdot \ln 2 \quad (31)$$

$$\ln 2 \cdot \sum_{i=0}^{K_{int}-1} 2^i = \ln 2 \cdot \frac{1-2^{K_{int}}}{1-2} = \ln 2 \cdot (2^{K_{int}} - 1) \geq 2^{K_{int}} - 1 \quad (32)$$

Equation (32) shows that with just $K_{int}$ iterations, for every $V_i$ value, its $k_i$ and the remainder of that iterative search may be assigned to $V_{pi}$, which will be a value $\in (-1,1)$.

The modified CORDIC engine 200, in this depicted example, includes a Vector Conversion Engine (VCE) 210 used to receive the input data set 205 and perform the transformation (shown in equation (30)) to generate a second data set 215 that includes a second-sub1 data set 215a (comprising $V_{pi}$) and a second-sub2 data set 215b (comprising $k_i$). By introducing the VCE 210 with $K_{int}$ parallel instantiations of the binary search shown in equation (32), a back to back stream of $V_i$ may be translated into a back to back output of values $V_{pi}$ and $k_i$. An example of a VCE architecture is described in further detail with reference to FIG. 3. Based on the equation (30), the SoftMax of a single element may be defined as:

$$SoftMax_i(\vec{V}) = \frac{e^{V_i}}{\sum_{j=1}^{n} e^{V_j}} = \frac{e^{V_{pi}+k_i \cdot \ln 2}}{\sum_{j=1}^{n} e^{V_{pj}+k_j \cdot \ln 2}} = \frac{2^{k_i} \cdot e^{V_{pi}}}{\sum_{j=1}^{n} (2^{k_j} \cdot e^{V_{pj}})} \quad (33)$$

SoftMax has been converted into exponential functions, with the $V_{pi}$ being $\in (-1, 1)$.

In some embodiments, the Rotation mode of the modified-CORDIC method may be used for exponential calculation, and based on the equation (26), the following constraint may be met for all of the $\phi_i$ values:

$$\Sigma_{\forall i} \phi_i > 1 \quad (34)$$

Unscaled modified-CORDIC exponential output may be defined as $f_{exp}(V) = e^V / An'$ where An is the scaling factor in equation (12).

$$SoftMax_i(\vec{V}) = \frac{2^{k_i} \cdot e^{V_{pi}}}{\sum_{j=1}^{n} (2^{k_j} \cdot e^{x_{pj}})} = \frac{2^{k_i} \cdot e^{V_{pi}}}{\sum_{j=1}^{n} (2^{k_j} \cdot f_{exp}(V_{pj}) \cdot An)} \quad (35)$$

By applying the natural logarithm, and after the exponential, $$SoftMax_i(\vec{V}) = e^{\ln(2^{k_i} \cdot e^{V_{pi}}) - \ln\left(\sum_{j=1}^{n}(2^{k_j} \cdot f_{exp}(V_{pj}) \cdot An)\right)} \quad (36)$$

$$= 2^{k_i} \cdot An^{-1} \cdot e^{V_{pi} - \ln\left(\sum_{j=1}^{n}(2^{k_j} \cdot f_{exp}(V_{pj}))\right)}$$

Every value in the summation $$\sum_{j=1}^{n} (2^{k_j} \cdot f_{exp}(V_{pj}))$$

may be represented as a floating point number, and a floating point adder may be used to perform the summation. An example of a RME1 architecture is described in further detail with reference to FIG. 4A. The summation $$\sum_{j=1}^{n} (2^{kj} \cdot f_{exp}(V_{pj}))$$

may add up to $2^{k_{total}} \cdot V_{total}$. The exponent result after the floating point addition of all of the values may be $k_{total}$, the mantissa result after the floating point addition of all of the values may be $V_{total}$, and the SoftMax for a single element may be:

$$SoftMax_i(\vec{V}) = 2^{k_i - k_{total}} \cdot An^{-1} \cdot e^{V_{pi} - ln\left(\frac{\sum_{j=1}^{n} 2^{kj} \cdot f_{exp}(V_{pj})}{2^{k_{total}}}\right)} \quad (37)$$

The mantissa in the floating point adder holds values up to 1, then the most significant bit (MSB) of that mantissa may be 1, and:

$$\frac{1}{2} \leq \frac{\sum_{j=1}^{n} 2^{kj} \cdot f_{exp}(V_{pj})}{2^{k_{total}}} \leq 1 \quad (38)$$

The modified CORDIC engine 200 includes a first Rotation Mode Engine (RME) 220 configured to perform the exponential calculation on the second data set 215 to obtain a third data set 225. The third data set 225 includes a third-sub1 data set 225a comprising $V_{total}$ and a third-sub2 data set 225b comprising $k_{total}$.

The modified CORDIC engine 200 also includes a floating point register 230 configured to receive the third data set 225 from the RME1 220. The modified CORDIC engine 200 also includes a Vectoring Mode Engine (VME) 240 coupled to the floating point register 230 to perform logarithm function on a third-sub1 data set 225a of the second processed data set 225. The VME 240 generates a fourth-sub1 data set 235a, and the fourth-sub1 data set 235a is then stored in the floating point register 230. An example of an VME architecture is described in further detail with reference to FIG. 5A. To compute the logarithm function using the Vectoring Mode of the modified-CORDIC, the condition may be:

$$-\sum_{\forall i} \phi_i \leq -\frac{1}{2} ln\left(\frac{\sum_{j=1}^{n} 2^{kj} \cdot f_{exp}(V_{pj})}{2^{k_{total}}}\right) \leq \sum_{\forall i} \phi_i \quad (39)$$

The input to the logarithm function will be $\in [\frac{1}{2}, 1)$, and the constraint is:

$$-ln\left(\frac{\sum_{j=1}^{n} 2^{kj} \cdot f_{exp}(V_{pj})}{2^{k_{total}}}\right) \leq 2 \cdot \sum_{\forall i} \phi_i \quad (40)$$

$$\frac{\sum_{j=1}^{n} 2^{kj} \cdot f_{exp}(V_{pj})}{2^{k_{total}}} \geq e^{-2 \cdot \sum_{\forall i} \phi_i} \quad (41)$$

The smallest value that $$\frac{\sum_{j=1}^{n} 2^{kj} \cdot f_{exp}(V_{pj})}{2^{k_{total}}}$$

may achieve is ½, and the constraint on $\phi_i$ may then be loosen:

$$\frac{1}{2} \geq e^{-2 \cdot \Sigma_i \phi_i}$$

$$\Rightarrow \sum_{\forall i} \phi_i \geq \frac{ln(2)}{2} \quad (42)$$

This condition on $\phi_i$ is already satisfied considering the first condition in equation (34). The modified CORDIC method may be used to compute the $$-\frac{1}{2} ln\left(\frac{\sum_{j=1}^{n} 2^{kj} \cdot f_{exp}(V_{pj})}{2^{k_{total}}}\right),$$

and the modified CORDIC implementation may be called $$f_{ln}(V) = -\frac{1}{2} ln(V).$$

By satisfying the equation (34), the exponential functions may be performed first, and the logarithm functions may be then performed. The SoftMax of a single element may become:

$$Soft Max_i(\vec{V}) = 2^{k_i - k_{total}} \cdot An^{-1} \cdot e^{V_{pi} + 2 f_{ln}\left(\frac{\sum_{j=1}^{n} 2^{kj} \cdot f_{exp}(V_{pj})}{2^{k_{total}}}\right)} \quad (43)$$

The modified CORDIC may be implemented in Rotation Mode to calculate the exponential function $$e^{V_{pi} + 2 f_{ln}\left(\frac{\sum_{j=1}^{n} 2^{kj} \cdot f_{exp}(V_{pj})}{2^{k_{total}}}\right)}.$$

The modified CORDIC engine 200 also includes a second Rotation Mode Engine (RME) 250 configured to perform exponential calculations on the second data set 215 and a fourth data set 245 (comprising the fourth-sub1 data set 235a and the third-sub2 data set 225b) to generate the output data set 255. The condition to perform the exponential function is the exponential function may be representable as $\Sigma_{\forall i} d_i \cdot \phi_i$.

$$-1 \le V_{pi} + 2 f_{ln}\left(\frac{\sum_{j=1}^{n} 2^{kj} \cdot f_{exp}(V_{pj})}{2^{k_{total}}}\right) \le 1 - \ln\frac{1}{2} = 1 + \ln 2 \quad (44)$$

A stronger constraint on the $\phi_i$ values may be obtained: $\Sigma_{\forall i} \phi_i \ge 1 + \ln 2$ (45) As long as the $\phi_i$ values satisfy the first condition, the second condition, the third condition and the condition shown in (44), the SoftMax of a single element may become:

$$\text{Soft Max}_i(\vec{V}) = 2^{k_i - k_{total}} \cdot f_{exp}\left(V_{pi} + 2 f_{ln}\left(\frac{\sum_{j=1}^{n} 2^{kj} \cdot f_{exp}(V_{pj})}{2^{k_{total}}}\right)\right) \quad (46)$$

In this depicted example, the floating point register 230 is implemented in the modified CORDIC engine 200. In some embodiments, some parts or all of the floating point register 230 may be implemented in the RME1 220, the VME 240 and/or the RME2 250. For example, the floating point register 230 may be implemented in the RME1 220. Thus, by using the modified CORDIC method that mainly based on shifts and adds, and without the need of any multipliers or dividers, SoftMax calculations may be easily performed. Accordingly, the implementation of SoftMax calculations may advantageously reduce the cost of silicon area. Although, in this depicted example, the RME1 220, the VME 240 and the RME2 250 are discussed as three different circuits, in some embodiments, the RME1 220, the VME 240 and the RME2 250 may be implemented in a single programmable circuit that may perform all of these functions. Thus, hardware resources used to form the modified CORDIC engine to perform SoftMax calculations may be advantageously reduced.

Figure 3:
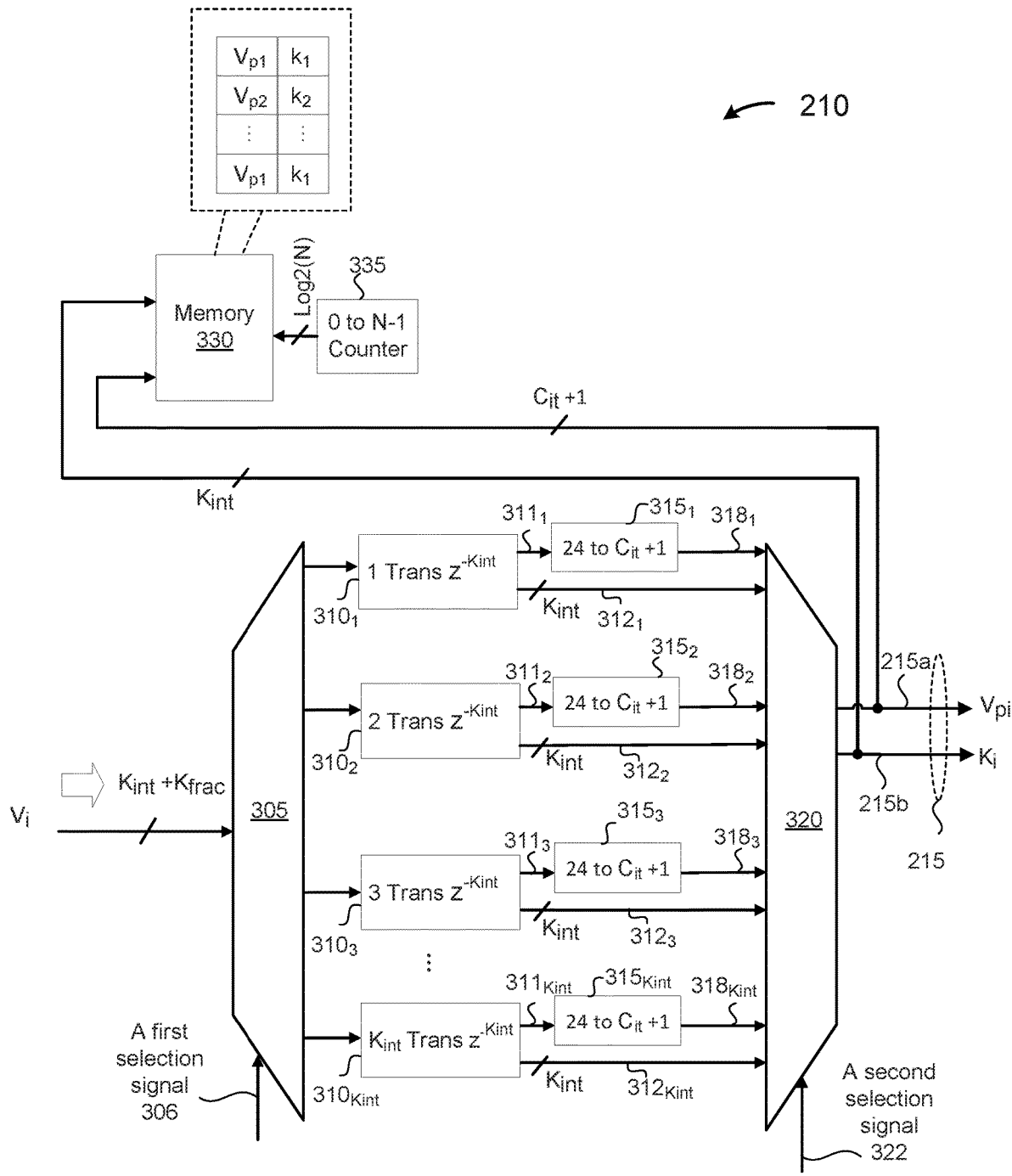
FIG. 3 depicts an exemplary vector conversion engine of the modified CORDIC engine.

FIG. 3 depicts an exemplary vector conversion engine of the modified CORDIC engine. As discussed before, every element $V_i$ of a vector $V$ in the input data set 205 may be converted into a new representation shown in equation (30). This conversion may be accomplished by performing a sequential subtraction of values ln2 for each $V_i$ element. This conversion, as shown in equation (31), may take $K_{int}$ clock cycles. The VCE 210 is configured to perform the vector conversion. The values $V_i$ injected into the VCE 210 may be fixed point values, and a number of bits $K_{int}$ may be used to represent the integer part, and a number of bits $K_{frac}$ may be used to represent the fractional part of the fixed point values.

In this depicted example, the VCE 210 includes a 1-to-$K_{int}$ ($K_{int} + K_{frac}$)-bit demultiplexer 305. The demultiplexer 305 is configured to receive $V_i$. A first selection signal 306 may be used to control the demultiplexer 305. The VCE 210 also includes $K_{int}$ (e.g., 10) transformation circuits 310$_1$-310$_{K_{int}}$ configured to perform sequential subtraction of the value ln(2) to the absolute value of transformation circuits' inputs $V_i$. The number of times the subtraction was able to take place will be $k_i$ values, and the remainder will be $V_{pi}$. In this depicted example, the number of bits utilized in this case for the precision of the value ln(2) has been chosen to be 24. The choice of 24 may be changed. The $K_{int}$ transformation circuits 310$_1$-310$_{K_{int}}$ are coupled to the output of the demultiplexer 305. Each transformation circuit 310$_1$-310$_{K_{int}}$ is configured to generate a corresponding first signal 311$_1$-311$_{K_{int}}$ (e.g., 24-bit signal) and a corresponding second signal 312$_1$-312$_{K_{int}}$. Each of the second signals 312$_1$-312$_{K_{int}}$ is a $K_{int}$-bit signal.

The VCE 210 also includes $K_{int}$ casting circuits 315$_1$-315$_{K_{int}}$ configured to trim the number of precision bits from, for example, 24 bits to $C_{it}+1$ bits. The value $C_{it}$ corresponds to the number of iterations chosen in the CORDIC algorithm. The additional bit in $C_{it}+1$ is used to consider the sign bit. Each of the casting circuits 315$_1$-315$_{K_{int}}$ is coupled to a corresponding transformation circuit 310$_1$-310$_{K_{int}}$ to receive a corresponding first signal 311$_1$-311$_{K_{int}}$ and generate a corresponding third signal 318$_1$-318$_{K_{int}}$.

The VCE 210 also includes a $K_{int}$-to-$1(K_{int}+C_{it}+1)$-bit multiplexer 320. The $K_{int}$-to-$1(K_{int}+C_{it}+1)$-bit multiplexer 320 is configured to receive the third signals 318$_1$-318$_{K_{int}}$ and the second signals 312$_1$-312$_{K_{int}}$. A second selection signal 322 may be used to control the multiplexer 320. The multiplexer 320 is configured to output the second data set 215. The second data set 215 includes the second-sub1 data set 215$a$ and the second-sub2 data set 215$b$. The second-sub1 data set 215$a$ includes $(C_{it}+1)$-bit $V_{pi}$. The second-sub2 data set 215$b$ includes $K_{in}$-bit corresponding $k_i$. Then, every element $V_i$ is converted into a new representation $V_i = V_{pi} + k_i \cdot \ln 2$, with $V_{pi} \in (-1,1)$, $k_i \in \mathbb{Z}$ shown in equation (30). The VCE 210 also includes memory 330 of N words of $(K_{int}+C_{it}+1)$ bits. The memory 330 is configured to receive the second-sub1 data set 215$a$ and the second-sub2 data set 215$b$. A counter 335 may be used to point to the address in memory 330 where a next bit of the second-sub1 data set 215$a$ and the second-sub2 data set 215$b$ to be stored.

Figure 4A:
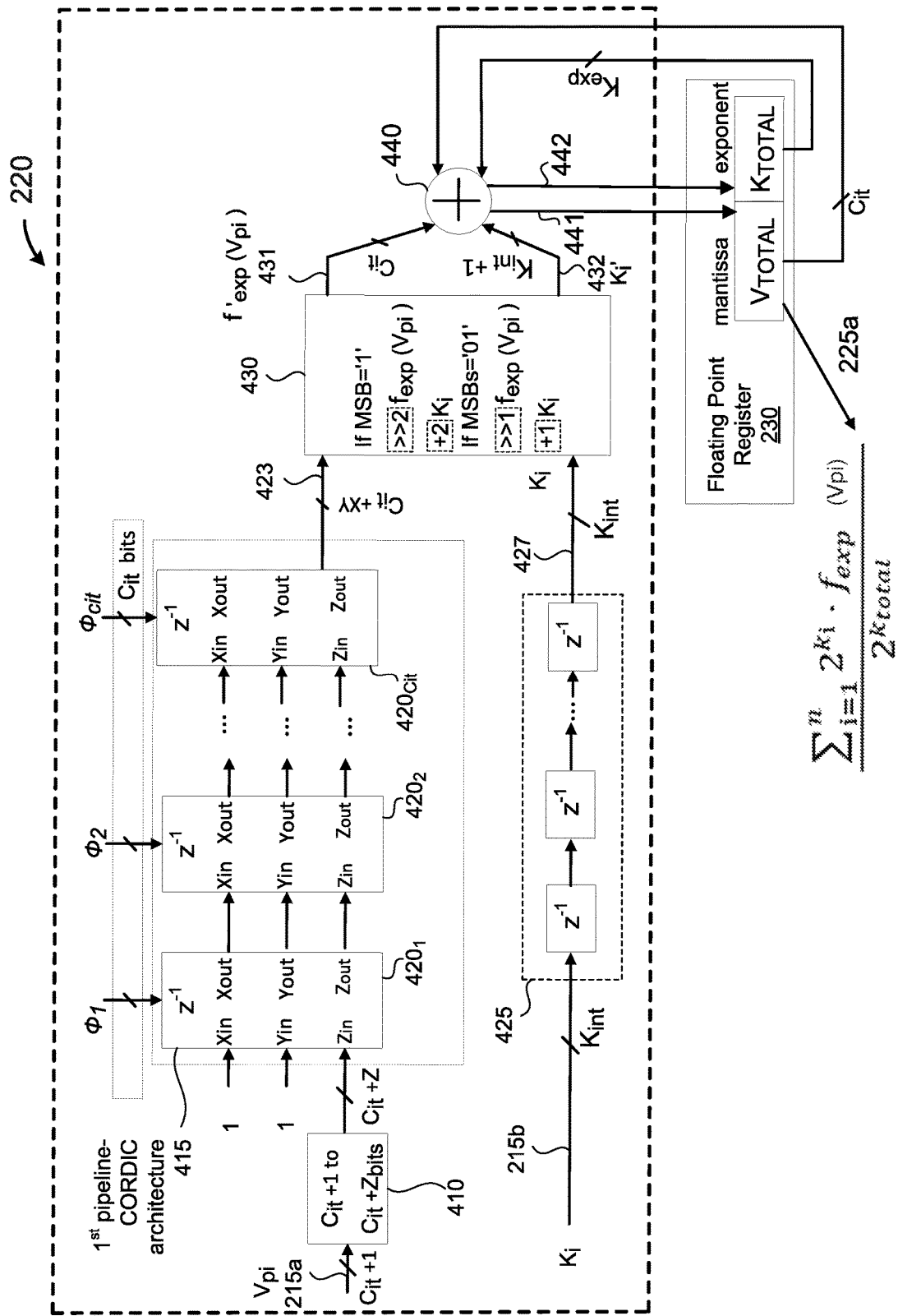
FIG. 4A depicts a first exemplary rotation mode engine of the modified CORDIC engine.

FIG. 4A depicts a first exemplary rotation mode engine of the modified CORDIC engine. The RME1 220 is coupled to the output of the VCE 210 to receive the second data set 215. In this depicted example, the RME1 220 includes a casting circuit 410 configured to cast its $(C_{it}+1)$-bit input (e.g., $V_{pi}$) into $(C_{it}+Z)$-bit input.

The RME1 220 also includes a first pipeline-CORDIC architecture 415 coupled to the output of the casting circuit 410. The first pipeline-CORDIC architecture 415 is configured by cascade-connecting $C_{it}$ stages of unit cells 420$_1$-420$_{Cit}$. Each stage of unit cell may be configured to work in rotation mode. An exemplary architecture of the rotation mode stage is discussed in further detail with reference to FIG. 4B. Each unit cell 420$_1$-420$_{Cit}$ configured to receive four inputs $X_{in}$, $Y_{in}$, $Z_{in}$, $\phi_i$, and generate three outputs $X_{out}$, $Y_{out}$, $Z_{out}$. Each unit cell 420$_1$-420$_{Cit}$ may introduce one clock cycle delay $Z^{-1}$. The four inputs $X_{in}$, $Y_{in}$, $Z_{in}$, and $\phi_i$ are configured to receive input data (e.g., incoming values $X_i$, $Y_i$, $Z_i$, and a corresponding angle $\phi_1 \sim \phi_{cit}$, respectively). The incoming values received by the first unit cell 420$_1$ are 1, 1, $V_{pi}$, and $\phi_1$.

The RME1 220 also includes a first delay path 425 configured to receive the second-sub2 data set 215$b$. The first delay path 425 may include one or more delay units connected in series to introduce a delay equal to the delay caused by the first pipeline-CORDIC architecture 415. The RME1 220 also includes a first state machine 430. The first state machine 430 is configured to the output of the first pipeline-CORDIC architecture 415 to receive a sixth signal 423 that includes $f_{exp}(V_{pj})$ and the output of the first delay path 425 to receive a seventh signal 427 that includes a delayed $k_i$. The first state machine 430 is configured to perform operations to generate an eighth signal 431 that includes $f_{exp}'(V_{p1})$ and a ninth signal 432 in response to the received sixth signal 423 and the received seventh signal 427. The first state machine 430 is configured to make sure that the value of $f_{exp}(V_{pj})$ doesn't have any integer part. If $f_{exp}(V_{pj})$ has an integer part, then $f_{exp}(V_{pj})$ will be shifted and $k_i$ will be increased accordingly, and the eighth signal 431 (e.g., shifted $f_{exp}(V_{pj})$) and the ninth signal 432 (e.g., increased $k_i$) are obtained. For example, when $f_{exp}(V_{pj})>1$, then a shift to the right of up to two positions may be performed, with an increase in the corresponding $k_i$ value. In the first pipeline-CORDIC architecture 415, the exponential calculation is performed, and the maximum input value in input Zin of unit cell 4201 will be the numeric value 1, making the maximum possible output $f_{exp}(V_{pj})$ 2.71=e^1. Thus, the integer part of the result $f_{exp}(V_{pj})$ may be up to 2 (e.g., integer part=0, 1 or 2) and the state machine 430 is configured to perform the transformation only when integer part is 1 or 2 (which maps to the cases of MSBs='01' and MSB='1' in FIG. 4A).

The RME1 220 also includes a summing circuit (e.g., a floating point adder) 440. The summing circuit 440 is configured to receive the eighth signal 431 and the ninth signal 432 from the first state machine 430. Both a tenth signal 441 that includes $f_{exp}(V_{pj})$ and an eleventh signal 442 that includes corresponding $k_i$ value will be added and accumulated for all the samples into the floating point register 230. The final values (e.g., the third data set 225) held by the floating point register 230 may include mantissa $V_{total}$ (included in a third-sub1 data set 225a) and the exponent $k_{total}$ (included in a third-sub2 data set 225b), the mantissa $$V_{total} = \frac{\sum_{j=1}^{n} 2^{kj} \cdot f_{exp}(V_{pj})}{2^{k_{total}}}.$$

Figure 4B:
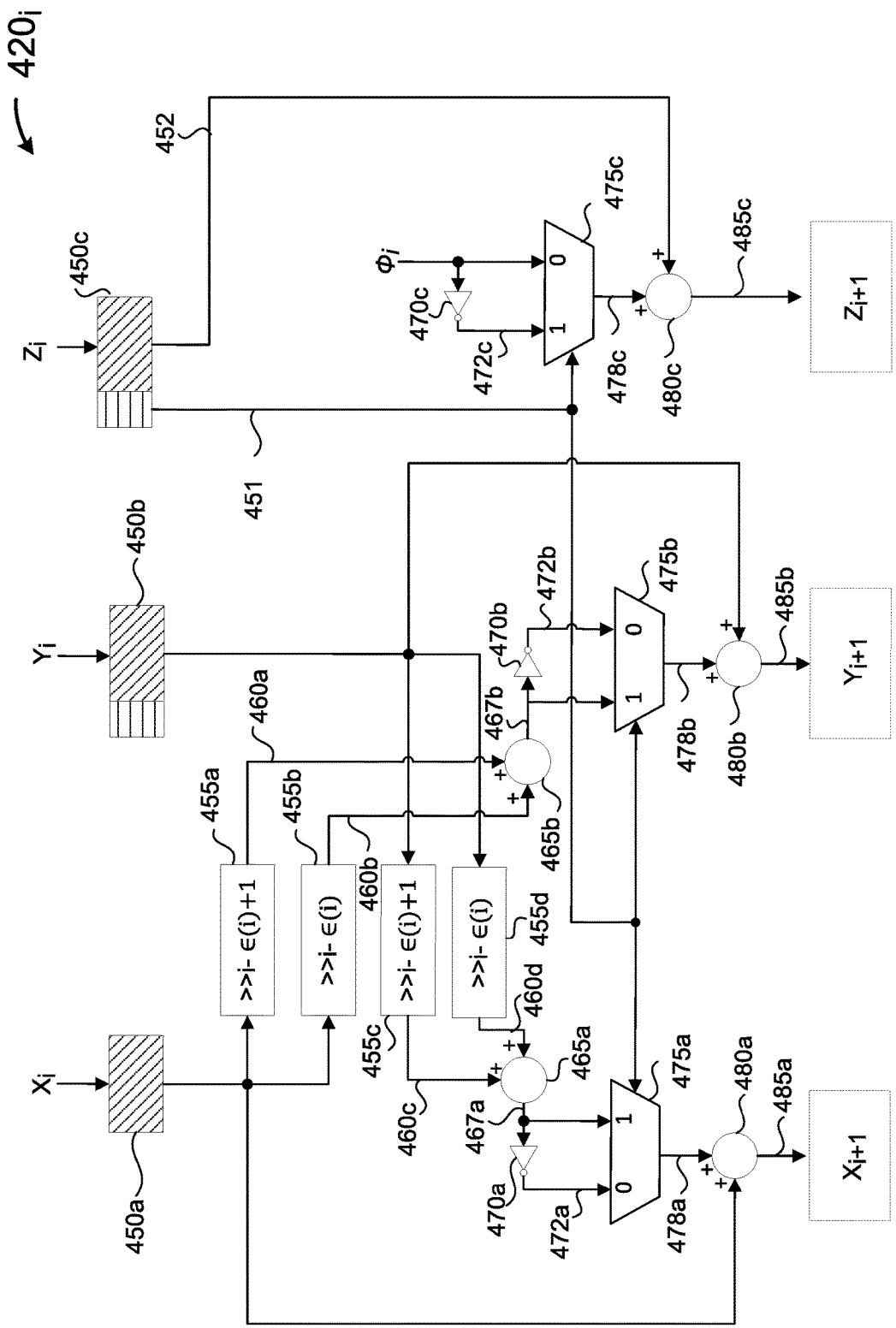
FIG. 4B depicts an exemplary unit cell implemented in rotation mode.

FIG. 4B depicts an exemplary unit cell implemented in rotation mode. In the original CORDIC, f(i) sequence is $$\frac{1}{2}, \frac{1}{4}, \frac{1}{8}, \frac{1}{16}, \frac{1}{32} \text{ etc.}$$

In the modified CORDIC version, there is a change to that f(i) sequence. For example, the modified f(i) sequence shown in Equation 25a. In the modified f(i) sequence, intermediate values are used, for example $$\left(\frac{1}{4} + \frac{1}{8}\right).$$

In order to achieve a multiplication by this value, the hardware resources are incremented with respect to the original CORDIC implementation. The intermediate values may be used very seldomly so that the three conditions mentioned before are satisfied. When $\theta_i=1$, an exemplary unit cell 420i implemented in the first pipeline-CORDIC architecture 415 includes a first buffer 450a configured to receive $x_i$, a second buffer 450b configured to receive $y_i$, and a third buffer 450c configured to receive $z_i$. $x_i$, $y_i$, and $z_i$ represent the respective input values from port $X_{in}$, $Y_{in}$ and $Z_{in}$ in a given CORDIC stage i. The value $\theta_i=1$ indicates a value that is the interpolation of two consecutive values is in the 2^(-i) sequence. The third buffer 450c is configured to output a first intermediate output signal 451 and a second intermediate output signal 452. The first intermediate output signal 451 includes the MSB of input $z_i$ to identify the sign of the input $z_i$, and the second intermediate output signal 452 includes the whole input $z_i$.

The unit cell 420i also includes a first shifter 455a coupled to the output of the first buffer 450a. The first shifter 455a may right shift the input $x_i$ (i−∈(i)+1) bits and then generates a first shifted signal 460a. The unit cell 420i also includes a second shifter 455b coupled to the output of the first buffer 450a. The second shifter 455b may right shift (i−∈(i)) bits of the input $x_i$ and then generates a second shifted signal 460b. The unit cell 420i also includes a third shifter 455c coupled to the output of the second buffer 450b. The third shifter 455c may right shift (i−∈(i)+1) bits of the input $y_i$ and then generates a third shifted signal 460c. The unit cell 420i also includes a fourth shifter 455d coupled to the output of the second buffer 450b. The fourth shifter 455d may right shift (i−∈(i)) bits of the input $y_i$ and then generates a fourth shifted signal 460d.

A first summing circuit 465a receives the third and fourth shifted signal 460c and 460d and generates a first summing signal 467a. The first summing signal 467a is inverted by a first inversion circuit 470a (e.g., an inverter). The first summing signal 467a and the inverted first summing signal 472a are received by a two-input multiplexer 475a. A second summing circuit 465b receives the first and second shifted signal 460a and 460b and generates a second summing signal 467b. The second summing signal 467b is inverted by a second inversion circuit 470b. The second summing signal 467b and the inverted second summing signal 472b are received by a two-input multiplexer 475b.

The first intermediate output signal 451 is used as a selection signal for both the multiplexer 475a and the multiplexer 475b. The multiplexer 475a then generates a first selected signal 478a, the first selected signal 478a and the input signal $x_i$ are received by a third summing circuit 480a to generate a first iteration signal 485a that includes $x_{i+1}$. The multiplexer 475b generates a second selected signal 478b, the second selected signal 478b and the input signal $y_i$ are received by a fourth summing circuit 480b to generate a second iteration signal 485b that includes $y_{i+1}$. The unit cell 420i also includes a third inversion circuit 470c receives and inverts a first angle signal that includes $\phi_i$. The first angle signal $\phi_i$ and the first inverted angle signal 472c are received by a third multiplexer 475c. The first intermediate output signal 451 is also used as a selection signal for the multiplexer 475c. The multiplexer 475c generates a third selected signal 478c, the third selected signal 478c and first angle signal $\phi_i$ are received by a fifth summing circuit 480c to generate a third iteration signal 485c that includes $z_{i+1}$.

Figure 4C:
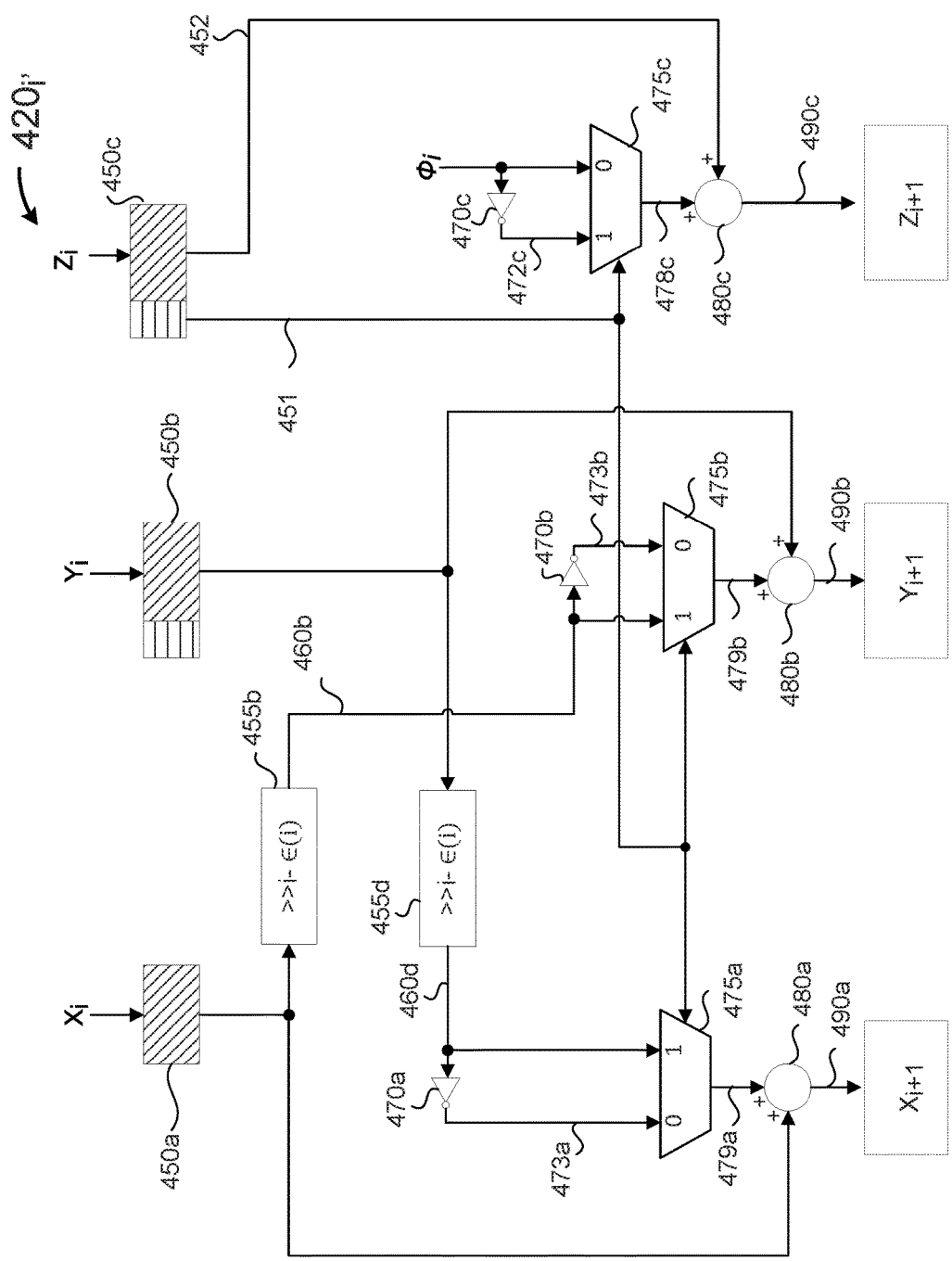
FIG. 4C depicts another exemplary unit cell implemented in rotation mode.

FIG. 4C depicts another exemplary unit cell implemented in rotation mode. When $\theta_i=0$, an exemplary unit cell 420i' implemented in the first pipeline-CORDIC architecture 415 includes the first buffer 450a configured to receive $x_i$, the second buffer 450b configured to receive $y_i$, and the third buffer 450c configured to receive $z_1$. The value $\theta_i=0$ indicates a value that is the interpolation of two consecutive values is not in the 2^(-i) sequence.

The unit cell 420i' includes the second shifter 455b coupled to the output of the first buffer 450a. The second shifter 455b may right shift the input $x_i$ (i−∈(i)) bits and then generates the second shifted signal 460b. The unit cell 420i also includes the fourth shifter 455d coupled to the output of the second buffer 450b. The fourth shifter 455d may right shift the input $y_i$ (i−∈(i)) bits and then generates the fourth shifted signal 460d.

The fourth shifted signal 460d is then inverted by the first inversion circuit 470a (e.g., an inverter). The fourth shifted signal 460d and the inverted fourth shifted signal 473a are received by the multiplexer 475a. The second shifted signal 460b is inverted by the second inversion circuit 470b. The second shifted signal 460b and the inverted second shifted signal 473b 472b are received by the multiplexer 475b. The first intermediate output signal 451 is used as a selection signal for both the multiplexer 475a and the multiplexer 475b. The multiplexer 475a then generates a first selected signal 479a, the first selected signal 479a and the input signal $x_i$ are received by the third summing circuit 480a to generate a first iteration signal 490a that includes $x_{i+1}$. The multiplexer 475b generates a second selected signal 479b, the second selected signal 479b and the input signal $y_i$ are received by the fourth summing circuit 480b to generate a second iteration signal 490b that includes $y_{i+1}$. The unit cell 420i also includes the third inversion circuit 470c receives and inverts the first angle signal that includes $\phi_i$. The first angle signal $\phi_i$ and the first inverted angle signal 472c are received by the third multiplexer 475c. The first intermediate output signal 451 is also used as a selection signal for the multiplexer 475c. The multiplexer 475c generates a third selected signal 478c, the third selected signal 478c and first angle signal $\phi_i$ are received by the fifth summing circuit 480c to generate the third iteration signal 490c that includes $z_{i+1}$.

Figure 5A:
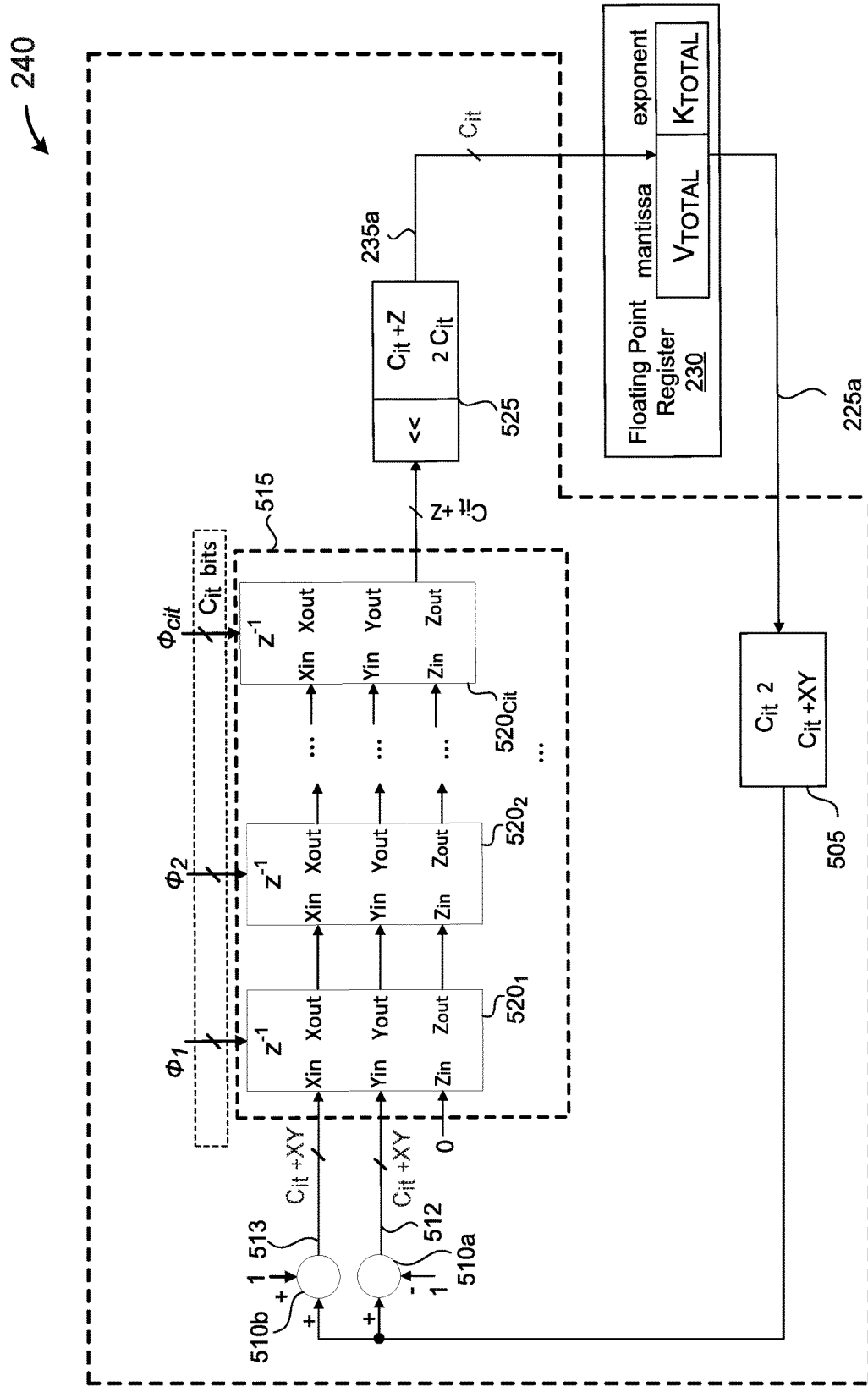
FIG. 5A depicts an exemplary vectoring mode engine of the modified CORDIC engine.

FIG. 5A depicts an exemplary vectoring mode engine of the modified CORDIC engine. The VME 240 is configured to receive the third-sub1 data set 225a and perform logarithm calculations on the third-sub1 data set 225a to generate a fourth-sub1 data set 235a. In this depicted example, the VME 240 includes a casting circuit 505 casting its ($C_{it}$ 2)-bit input into ($C_{it}$+XY)-bit input. The casting circuit 505 is coupled to the floating point register 230 to receive the mantissa $V_{total}$ (e.g., the third-sub1 data set 225a). The mantissa $V_{total}$ is then received by a first subtracting circuit 510a and a fourth summing circuit 510b, respectively. The first subtracting circuit 510a subtracts one from the mantissa $V_{total}$ to generate a first subtracting signal 512. The fourth summing circuit 510b adds 1 to the mantissa $V_{total}$ to generate a first summing signal 513.

The VME 240 also includes a second pipeline-CORDIC architecture 515 coupled to the output of the first subtracting circuit 510a and the output of the fourth summing circuit 510b. The second pipeline-CORDIC architecture 515 is configured by cascade-connecting $C_{it}$ stages of unit cells $520_1$-$520_{Cit}$. Each stage of unit cell may be configured to work in vectoring mode. An exemplary architecture of the vectoring mode stage is discussed in further detail with reference to FIG. 5B. Each unit cell $520_1$-$520_{Cit}$ includes four inputs $X_{in}$, $Y_{in}$, $Z_{in}$, $\phi_i$ and three outputs $X_{out}$, $Y_{out}$, $Z_{out}$. The four inputs $X_{in}$, $Y_{in}$, $Z_{in}$, and $\phi_i$ are configured to receive input data (e.g., incoming values $X_i$, $Y_i$, $Z_i$, and a corresponding angle $\phi_1$~$\phi_{cit}$, respectively). The incoming values received by the four inputs $X_{in}$, $Y_{in}$, $Z_{in}$, $\phi_i$ of the first unit cell $520_1$ are the first summing signal 513, the first subtracting signal 512, 0, and $\phi_1$, respectively.

The VME 240 also includes a shifter and trimming circuit 525 coupled to the output $Z_{out}$ of the last unit cell $520_{Cit}$ in the second pipeline-CORDIC architecture 515 to shift the output $Z_{out}$ of the last unit cell $520_{Cit}$ by one position to achieve the multiplication by 2 required, and trimming the input number of bits from $C_{it}$+Z to $C_{it}$. The shifter and trimming circuit 525 outputs a logarithm signal (e.g., fourth-sub1 data set 235a) that includes $$2f_{ln}\left(\frac{\sum_{j=1}^{n} 2^{kj} \cdot f_{exp}(V_{pj})}{2^{k_{total}}}\right).$$

The fourth-sub1 data set 235a is then stored in the floating point register 230.

Figure 5B:
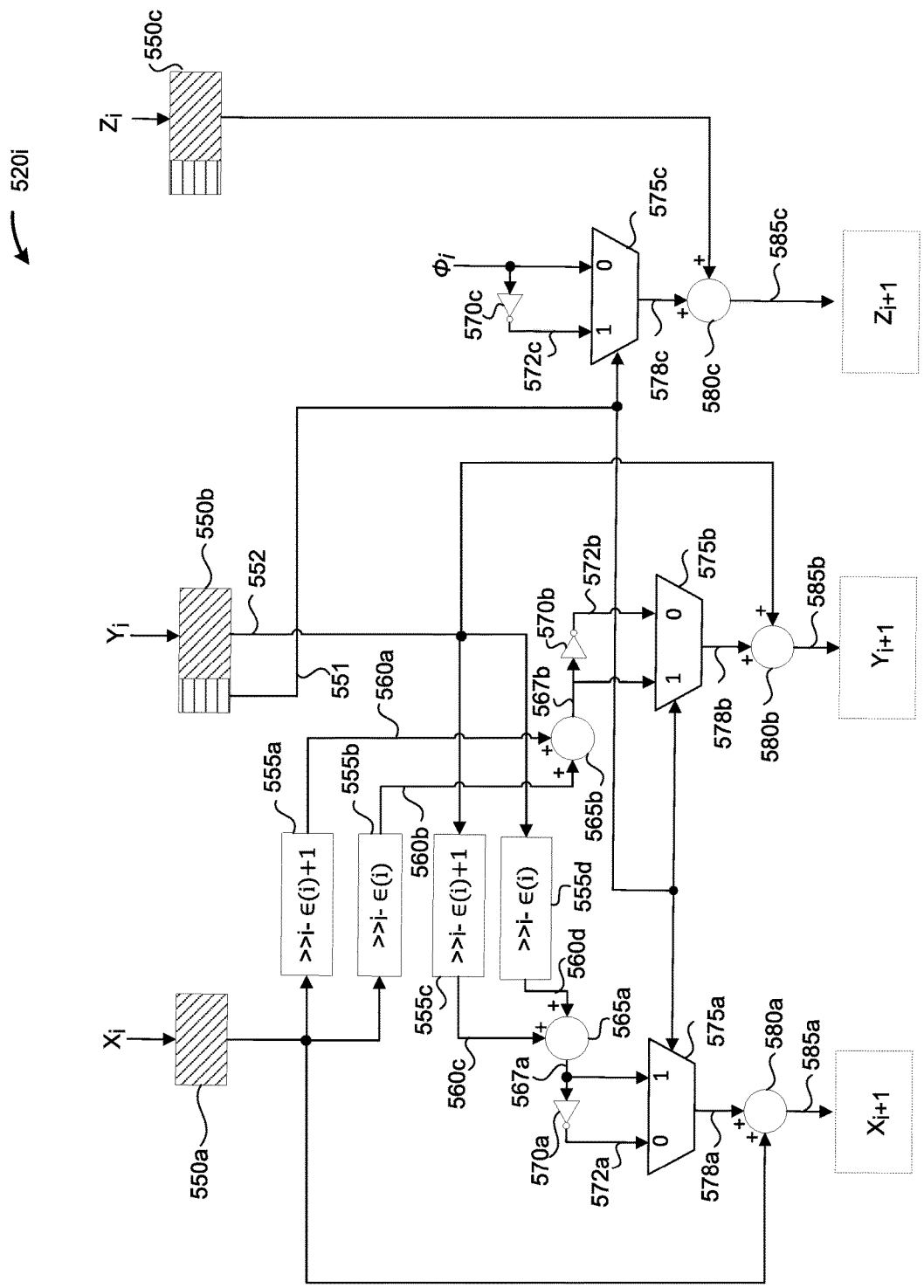
FIG. 5B depicts an exemplary unit cell implemented in vectoring mode.

FIG. 5B depicts an exemplary unit cell implemented in vectoring mode. When $\theta_i=1$, an exemplary unit cell 520i implemented in the second pipeline-CORDIC architecture 515 includes a first buffer 550a configured to receive $x_i$, a second buffer 550b configured to receive $y_i$, and a third buffer 550c configured to receive $z_i$. $x_i$, $y_i$, and $z_i$ represent the respective input values from port Xin, Yin and Zin in a given CORDIC stage i. The second buffer 550b is configured to output a first intermediate output signal 551 and a second intermediate output signal 552. The first intermediate output signal 551 includes the MSB of input $y_i$ to identify the sign of the input $y_i$, and the second intermediate output signal 552 includes the whole input $y_i$.

The unit cell 520i also includes a first shifter 555a coupled to the output of the first buffer 550a. The first shifter 555a may right shift the input $x_i$ (i−∈(i)+1) bits and then generates a first shifted signal 560a. The unit cell 520i also includes a second shifter 555b coupled to the output of the first buffer 550a to receive second intermediate output signal 552 includes the whole input $y_i$. The second shifter 555b may right shift the input $x_i$ (i−∈(i)) bits and then generates a second shifted signal 560b. The unit cell 520i also includes a third shifter 555c coupled to the output of the second buffer 550b. The third shifter 555c may right shift the input $y_i$ (i−∈(i)+1) bits and then generates a third shifted signal 560c. The unit cell 520i also includes a fourth shifter 555d coupled to the output of the second buffer 550b. The fourth shifter 555d may right shift the input $y_i$ (i−∈(i)) bits and then generates a fourth shifted signal 560d.

A summing circuit 565a receives the third and fourth shifted signal 560c and 560d and generates a first summing signal 567a. The first summing signal 567a is inverted by a first inversion circuit 570a (e.g., an inverter). The first summing signal 567a and the inverted first summing signal 572a are received by a two-input multiplexer 575a. A second summing circuit 565b receives the first and second shifted signal 560a and 560b and generates a second summing signal 567b. The second summing signal 567b is inverted by a second inversion circuit 570b. The second summing signal 567b and the inverted second summing signal 572b are received by a two-input multiplexer 575b.

The first intermediate output signal 551 is used as a selection signal for both the multiplexer 575a and the multiplexer 575b. The multiplexer 575a then generates a first selected signal 578a, the first selected signal 578a and the input signal $x_i$ are received by a third summing circuit 580a to generate a first iteration signal 585a that includes $x_{i+1}$. The multiplexer 575b generates a second selected signal 578b, the second selected signal 578b and the input signal $y_i$ are received by a fourth summing circuit 580b to generate a second iteration signal 585b that includes $y_{i+1}$. The unit cell 520i also includes a third inversion circuit 570c receives and inverts a first angle signal that includes $\phi_i$. The first angle signal $\phi_i$ and the first inverted angle signal 572c are received by a third multiplexer 575c. The first intermediate output signal 551 is also used as a selection signal for the multiplexer 575c. The multiplexer 575c generates a third selected signal 578c, the third selected signal 578c and first angle signal $\phi_i$ are received by a fifth summing circuit 580c to generate a third iteration signal 585c that includes $z_{i+1}$.

Figure 5C:
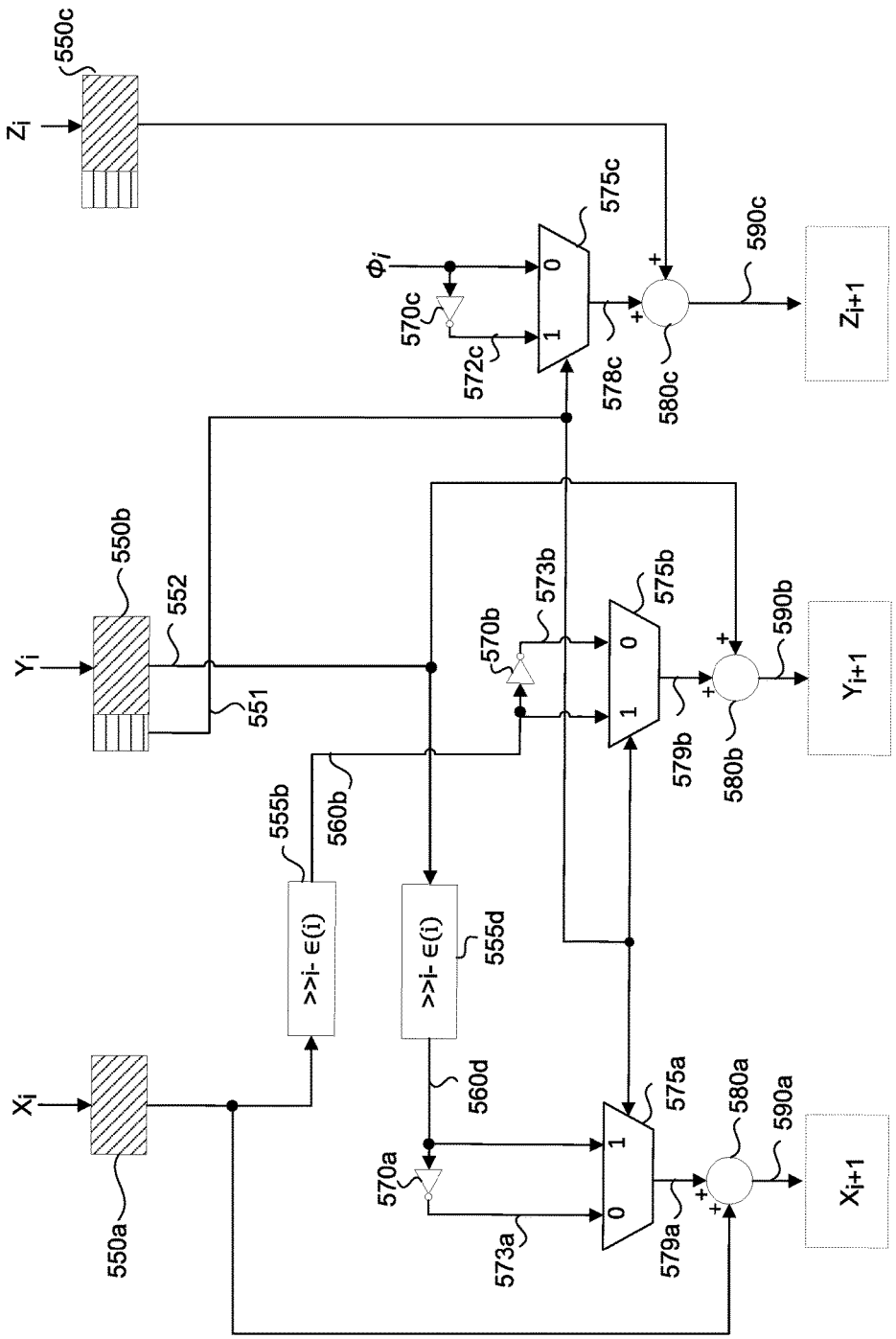
FIG. 5C depicts another exemplary unit cell implemented in vectoring mode

FIG. 5C depicts an exemplary unit cell implemented in vectoring mode. When $\theta_i=0$, an exemplary unit cell $520i'$ implemented in the second pipeline-CORDIC includes the first buffer $550a$ configured to receive $x_i$, the second buffer $550b$ configured to receive $y_i$, and the third buffer $550c$ configured to receive $z_i$. The second buffer $550b$ is configured to output the first intermediate output signal $551$ and the second intermediate output signal $552$. The first intermediate output signal $551$ includes the MSB of input $y_i$ to identify the sign of the input $y_i$, and the second intermediate output signal $552$ includes the whole input $y_i$.

The unit cell $520i$ also includes the second shifter $555b$ coupled to the output of the first buffer $550a$. The second shifter $555b$ may right shift the input $x_i$ $(i-\in(i))$ bits and then generates the second shifted signal $560b$. The unit cell $520i$ also includes the fourth shifter $555d$ coupled to the output of the second buffer $550b$ to receive the second intermediate output signal $552$ includes the whole input $y_i$. The fourth shifter $555d$ may right shift the input $y_i$ $(i-\in(i))$ bits and then generates the fourth shifted signal $560d$.

The fourth shifted signal $560d$ is inverted by a first inversion circuit $570a$ (e.g., an inverter). The fourth shifted signal $560d$ and the inverted fourth shifted signal $573a$ are received by the multiplexer $575a$. The second shifted signal $560b$ is inverted by the second inversion circuit $570b$. The second shifted signal $560b$ and the inverted second shifted signal $573b$ are received by the multiplexer $575b$.

The first intermediate output signal $551$ is used as a selection signal for both the multiplexer $575a$ and the multiplexer $575b$. The multiplexer $575a$ then generates a first selected signal $579a$, the first selected signal $579a$ and the input signal $x_i$ are received by the third summing circuit $580a$ to generate a first iteration signal $590a$ that includes $x_{i+1}$. The multiplexer $575b$ generates a second selected signal $579b$, the second selected signal $579b$ and the input signal $y_i$ are received by the fourth summing circuit $580b$ to generate a second iteration signal $590b$ that includes $y_{i+1}$. The unit cell $520i$ also includes the third inversion circuit $570c$ receives and inverts a first angle signal that includes $\phi_i$. The first angle signal $\phi_i$ and the first inverted angle signal $572c$ are received by the third multiplexer $575c$. The first intermediate output signal $551$ is also used as a selection signal for the multiplexer $575c$. The multiplexer $575c$ generates a third selected signal $578c$, the third selected signal $578c$ and first angle signal $\phi_i$ are received by the fifth summing circuit $580c$ to generate a third iteration signal $590c$ that includes $z_{i+1}$. In some embodiments, as hardware resources used in the first pipelined-architecture $415$ are similar to the hardware resources used in the second pipelined-architecture $515$, a hybrid architecture may be designed to work in a rotation mode or a vectoring mode by a control signal. For example, a multiplexer may be used to receive both the sign signal $451$ of input Zi and sign signal of input yi, and the control signal may select between the two sign signals $451$ and $551$ to control working mode of the hybrid architecture.

Figure 6:
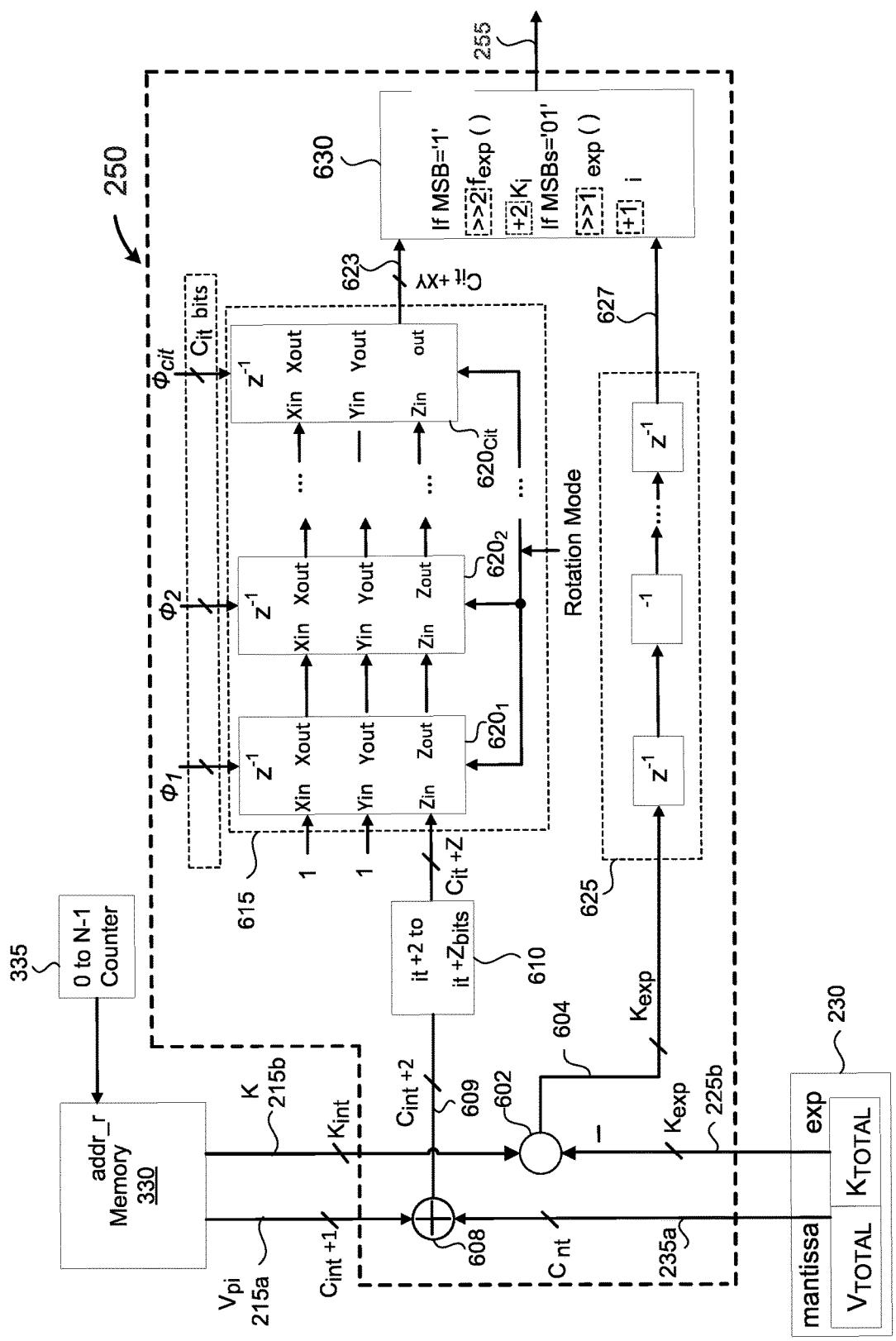
FIG. 6 depicts a second exemplary rotation mode engine of the modified CORDIC engine.

FIG. 6 depicts a second exemplary rotation mode engine of the modified CORDIC engine. The RME2 $250$ is configured to receive the second data set $215$ (having $V_{pi}$ and $k_i$) and the fourth data set $425$ (having $$2f_{ln}\left(\frac{\sum_{j=1}^{n} 2^{k_j} \cdot f_{exp}(V_{pj})}{2^{k_{total}}}\right)$$

and $k_i$).

In this depicted example, the RME2 $250$ includes a second subtracting circuit $602$ configured to subtract exponent $k_{total}$ (included in the third-sub2 data set $225b$) from $k_i$ (included in the second-sub2 data set $215b$) and generate a second subtracting signal $604$ (that includes $k_i-k_{total}$). The RME2 $250$ also includes an eighth summing circuit $608$ configured to receive the second-sub1 data set $215a$ that includes $V_{pi}$ and the fourth-sub1 data set $235a$ that includes $$2f_{ln}\left(\frac{\sum_{j=1}^{n} 2^{k_j} \cdot f_{exp}(V_{pj})}{2^{k_{total}}}\right)$$

to generate a second summing signal $609$. The second summing signal $609$ (includes $$V_{pi} + 2f_{ln}\left(\frac{\sum_{j=1}^{n} 2^{k_j} \cdot f_{exp}(V_{pj})}{2^{k_{total}}}\right)$$

is then casted from $C_{it}+2$ bits into $C_{it}+Z$ bits in a casting circuit $610$. A third pipeline-CORDIC architecture $615$ coupled to the output of the casting circuit $610$. The third pipeline-CORDIC architecture $615$ is configured by cascade-connecting $C_{it}$ stages of unit cells $620_1$-$620_{Cit}$. Each stage of unit cell may be configured to work in rotation mode. Each unit cell $620_1$-$620_{Cit}$ includes four inputs $X_{in}$, $Y_{in}$, $Z_{in}$, $\phi_i$, and three outputs $X_{out}$, $Y_{out}$, $Z_{out}$. The four inputs $X_{in}$, $Y_{in}$, $Z_{in}$, and $\phi_i$ are configured to receive input data (e.g., incoming values $X_i$, $Y_i$, $Z_i$, and a corresponding angle $\phi_1$~$\phi_{cit}$, respectively). The incoming values received by the first unit cell $620_1$ are 1, 1, the second summing signal $609$, and $\phi_1$. In some embodiments, the third pipeline-CORDIC architecture $615$ may have the same architecture with the first pipeline-CORDIC architecture $415$ as shown in FIGS. 4A-4C.

The RME2 $250$ also includes a second delay path $625$ configured to receive the second subtracting signal $604$ (that includes $k_i-k_{total}$). The second delay path $625$ may include one or more delay units connected in series to introduce a delay equal to the delay caused by the third pipeline-CORDIC architecture $615$. The RME2 $250$ also includes a second state machine $630$. The second state machine $630$ is configured to the output of the third pipeline-CORDIC architecture $615$ to receive a twelfth signal $623$ that includes $$f_{exp}(V_{pi}) + 2f_{ln}\left(\frac{\sum_{j=1}^{n} 2^{k_i} \cdot f_{exp}(V_{pi})}{2^{k_{total}}}\right)$$

and the output of the delay path $625$ to receive a thirteenth signal $627$ that includes a delayed second subtracting signal. The second state machine $630$ is configured to perform operations to generate the output data set $255$ in response to the received twelfth signal $623$ and the received thirteenth signal $627$. For example, when $$f_{exp}(V_{pi} + 2f_{ln}\left(\frac{\sum_{j=1}^{n} 2^{k_j} \cdot f_{exp}(V_{pi})}{2^{k_{total}}}\right) > 1,$$

then a shift to the right of up to two positions may be performed, with an increase in the corresponding $k_i$ value. Thus, SoftMax calculation may be easily performed by the modified CORDIC engine 200.

Figure 7A:
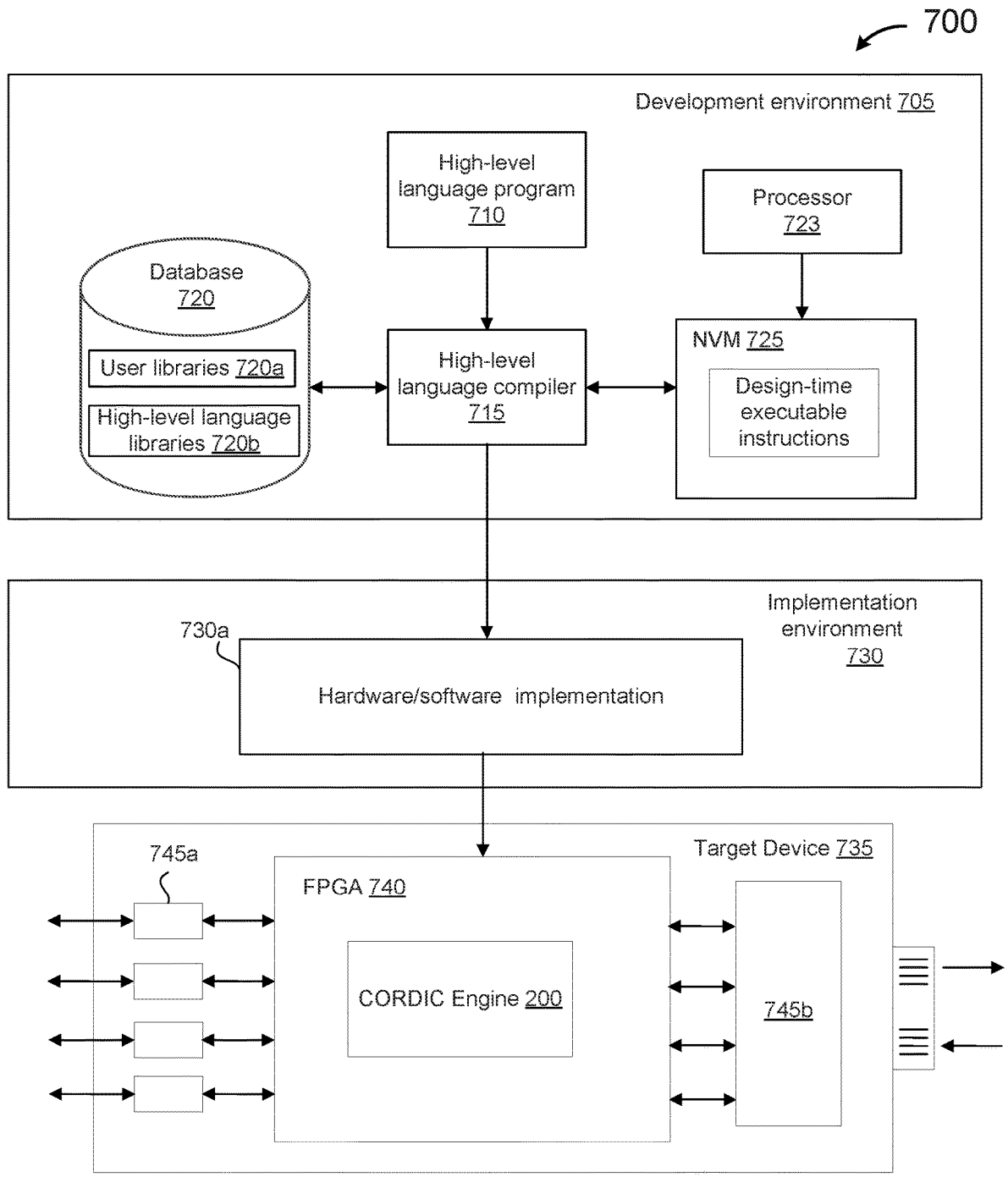
FIG. 7A depicts a block diagram of an exemplary configuration system having a development environment and an implementation environment to implement the modified CORDIC engine in a field programmable gate array (FPGA) device.

FIG. 7A depicts a block diagram of an exemplary configuration system having a development environment and an implementation environment to implement the modified CORDIC engine in a field programmable gate array (FPGA) device. A configuration system 700 includes a development environment 705. The development environment 705 may be a software suite (such as the Vivado® Suite distributed by Xilinx, Inc) including a number of tools for performing EDA design. A user may, via a user interface, use a high-level language to generate, at design time, instructions that can produce, via register transfer logic (RTL) generation at compile time, a modified CORDIC engine (e.g., the modified CORDIC engine 200) that, at run-time, can efficiently perform SoftMax calculation. The environment 705 includes a, for example, high-level language program 710, such as HDL code, that is used for designing hardware systems. The program 710 may be compiled by a high-level language compiler 715. The HLL compiler 715 operatively connects with the HLL program 710 and a database 720. In this depicted example, the database 720 includes user libraries 720a and HLL libraries 720b. For example, the user libraries 720a may include different multiplexers, inversion circuits, and delay circuits. The HLL compiler 715 may select available library files in the database 720 to compile HLL commands into one or more sets of instructions, which may also be referred to as data structures.

The environment 705 may be running on a processor 723 operably coupled to non-volatile memory (NVM) 725. NVM 725 contains instructions, that when executed by the processor 723, cause the processor 723 to perform operations that enable the various tools and functionality of the environment 705. For example, the NVM 725 may include design-time executable instructions that perform various operations involving EDA design. NVM 725 also may include design-time executable instructions that include various programs, routines, and/or operations that are executed during design time for a target device (e.g., when the target device is being configured/set up).

The configuration system 700 includes an implementation environment 730. In some examples, the implementation environment 730 may be packaged with the development environment 705. The implementation environment 730 includes various tools 730a for hardware and/or software simulation, synthesis/regeneration, and/or implementation (e.g., place and route). An implementation engineer, for example, may employ some compiler tools to convert the instructions stored in the NVM 725 into hardware/software implementations 730a that can be loaded via a bitstream, for example, into a target device such as an FPGA. In some embodiments, the implementation environment 730 may generate the appropriate data files to realize fixed hardware (e.g., in an ASIC) in accordance with the design specified by, for example, the user-input high-level language programming in the development environment 705.

A target device 735 may, for example, be a system on a chip (SOC) that includes various components, at least one among them being a field programmable gate array (FPGA) 740. The FPGA 740 may be programmed/configured "on-the-fly" to the modified CORDIC engine 200 by taking a bitstream of the implementation generated by environments 705 and 730 and writing the bitstream into programmable logic (PL) of the FPGA 740.

The target device 735 includes a number of buffers 745a (e.g., which may form an I/O interface) that connect external signals into the FPGA 740. The FPGA 740 may include n programmable logic blocks that represent programmable hardware resources available to realize circuitry in accordance with the design specified by, for example, the user-input high-level language programming in the development environment 705. The FPGA 740 also connects with other devices 745b, which may provide a variety of auxiliary functions. Exemplary process flow steps that may be performed at design time are described in further detail, for example, with reference to FIG. 8A. Thus, by using the modified CORDIC method that mainly based on shifts and adds, and without the need of any multipliers, SoftMax calculations may be easily performed. Accordingly, the implementation of SoftMax calculations may advantageously reduce the cost of silicon area and/or the instructions performed by a processing engine.

In some embodiments, part or all functions of the modified CORD IC engine 200 may be implemented in the processor 723. A data storage device (e.g., NVM 725) may be coupled to the processor 723 and containing a program of instructions that, when executed by the processor 723, cause the processor 723 to perform operations to conduct SoftMax calculation. The operations may include (a) retrieving an input vector V representative of an input data set, (b) transforming each element $V_i$ of the input vector V into another expression shown in equation 30 to generate a second data set (e.g., the second data set 215), (c) determining (e.g., by the processor 723) whether each and every element $V_i$ in the input vector V has been transformed. If all elements have been transformed, the operations may also include (d) performing exponential calculations on the second data set 215 to generate a third data set 225 comprising a third-sub1 data set 225a and a third-sub2 data set 225b, and (e) performing logarithm calculations to generate a fourth-sub1 data set 235a and storing the fourth-sub1 data set 235a in the floating point register 230. The operations may also include (f) performing exponential calculations to generate an output data set (e.g., the output data set 255). Thus, SoftMax calculations may be easily performed by using the modified CORDIC method that mainly based on shifts and adds, and without the need of any multipliers.

An example to implement the modified-CORDIC method in software is discussed. The following pseudo code explains an exemplary way to calculate the exponential function using the modified-CORDIC method. According to the number of iterations used (cordic_iter or $C_{it}$ shown in FIG. 4A), and the input range of values for which the exponential function is evaluated, sequences f(i), $\phi_i$, and $\phi_i$ may be defined. In a modified-CORDIC implementation, there are values of i for which $$f(i) = 2^{-(i-\Sigma_{j=1}^{i-1} j)},$$

and there are also values of i for which $$f(i) = 2^{-(i-\Sigma_{j=1}^{i-1} j)} + 2^{-(i+1-\Sigma_{j=1}^{i-1} j)},$$

which may be determined by the values of sequence $\theta_i$. When $\theta_i=0$, $$f(i) = 2^{-(i-\Sigma_{j=1}^{i-1} j)},$$

and when $\theta_i=1$, $$f(i) = 2^{-(i-\Sigma_{j=1}^{i-1} j)} + 2^{-(i+1-\Sigma_{j=1}^{i-1} j)}.$$

$$\theta_i \in \{0, 1\}$$

$$\epsilon(i) = \sum_{j=1}^{i-1} \theta_j$$

$$f(i) = \begin{cases} 2^{-(i-\epsilon(i))}, & \text{if } \theta_i = 0 \\ 2^{-(i-\epsilon(i))} + 2^{-(i+1-\epsilon(i))}, & \text{if } \theta_i = 1 \end{cases}$$

$$\phi_i = \operatorname{atanh}(f(i))$$

$$\exp_{range} = \sum_{i=1}^{+\infty} \phi_i$$

$$A_n = \prod_{i=1}^{n} \cosh \phi_i$$

Exemplary algorithm ALGORITHM-1 to perform exponential calculations may be:

```
1:   Procedure EXP_CORDIC
2:       cordic_iter ← number of cordic iterations
3:       xy_state ← 1
4:       in_value ← exponential input value ∈ (−exp_range, exp_range)
5:       z_state ← in_value
6:       i ← 1
7:   loop:
8:       while i ≤ cordic_iter do
9:           if z_state < 0 then
10:              if θ_i == 0 then
11:                  xy_state ← xy_state − (xy_state >> i − ε(i))
12:              else
13:                  xy_state ← xy_state − (xy_state >> i − ε(i)) − (xy_state >> i + 1 − ε(i))
14:              z_state ← z_state + φ_i
15:          else
16:              if θ_i == 0 then
17:                  xy_state ← xy_state + (xy_state >> i − ε(i))
18:              else
19:                  xy_state ← xy_state + (xy_state >> i − ε(i)) + (xy_state >> i + 1 − ε(i))
20:              z_state ← z_state − φ_i
21:          i = i + 1
```

The final value of variable $xy_{state}$ variable in the ALGORITHM-1 may be proportional to desired exponential, with a value of $A_n^{-1} \cdot e^{-in\_value}$. The following pseudo code explains an exemplary way to calculate the logarithm function using the modified-CORDIC method. In some embodiments, sequences $f(i)$, $\phi_i$, and $\theta_i$ used in the exponential and the logarithm CORDIC-based calculations may be kept the same. According to the choice of $\phi_i$, a new input range may be defined for the logarithm implementation. In this example, $$\ln_{range} = e^{2\Sigma_{i=1}^{+\infty} \phi_i},$$

and the input range of values for the logarithm calculation may be $\in (\ln_{range}^{-1}, \ln_{range})$. Exemplary algorithm ALGORITHM-2 to perform logarithm calculations may be:

```
1:   Procedure LN_CORDIC
2:       cordic_iter ← number of cordic iterations
3:       in_value ← logarithm input value ∈ (ln_range^−1, ln_range)
4:       x_state ← in_value +1
5:       y_state ← in_value −1
6:       z_state ← 0
```

-continued

```
 7:           i ← 1
 8:      loop:
 9:           while i ≤ cordic_iter do
10:                if y_state > 0 then
11:                     if θ_i == 0 then
12:                          x_state ← x_state − (y_state >> i − ε(i))
13:                          y_state ← y_state − (x_state >> i − ε(i))
14:                     else
15:                          x_state ← x_state − (y_state >> i − ε(i)) − (y_state >> i + 1 − ε(i))
16:                          y_state ← y_state − (x_state >> i − ε(i)) − (x_state >> i + 1 − ε(i))
17:                     z_state ← z_state + φ_i
18:                else
19:                     if θ_i == 0 then
20:                          x_state ← x_state + (y_state >> i − ε(i))
21:                          y_state ← y_state + (x_state >> i − ε(i))
22:                     else
23:                          x_state ← x_state + (y_state >> i − ε(i)) + (y_state >> i + 1 − ε(i))
24:                          y_state ← y_state + (x_state >> i − ε(i)) + (x_state >> i + 1 − ε(i))
25:                     z_state ← z_state − φ_i
26:                i = i + 1
```

The final value of the variable $z_{state}$ in the ALGORITHM-2 may be proportional to a desired logarithm, with a value of ½ ln (in_value). The following pseudocode depicts a way that SoftMax is calculated over in input vector $\vec{V}=(V(1), V(2), \ldots, V(n))$, using the exponential and logarithm calculations based on the modified-CORDIC method. In this depicted example, each number V(i) may not be a very large number, and input transformation steps may be achieved by performing an iterative subtraction instead of dividing. Exemplary algorithm ALGORITHM-3 to perform input transformation may be:

```
 1:  Procedure SOFTMAX_CORDIC
 2:       V⃗ ← input vector of values V(1) to V(n)
 3:       1. Input transformation: Each value in the input vector x⃗ is transformed into two values
         V_P(i) and k_P(i), so that V(i) = V_P(i) + k_P(i) · ln2.
 4:       k⃗_P ← 0⃗
 5:       V⃗_P ← 0⃗
 6:       for (i = 1; i ≤ n; i + + ) do
 7:            if V(i) < 0 then
 8:                 aux ← −V(i)
 9:            else
10:                 aux ← V(i)
11:            while aux − ln2 > 0 do
12:                 aux ← aux − ln2
13:                 k_P(i) ← k_P(i) + 1
14:            V_P(i) ← aux
15:            if V(i) < 0 then
16:                 k_P(i) ← − k_P(i)
17:                 V_P(i) ← −V(i)
18:       2. Calculate Normalizing Factor: For each −1<V_P(i)<1, a condition may need to meet is
```

$$\exp_{range} = \sum_{i=1}^{+\infty} \phi_i \geq 1.$$

This step may generate the dominator of the Softmax expression, which is $\sum_{i=1}^{+\infty} 2^{k_P(i)} \cdot \exp CORDIC(V_P(i))$.

This normalizing value will be then scaled by An.
```
19:       norm ← 0
20:       for (i = 1; i ≤ n; i + + ) do
21:            norm ← norm +( expCORDIC (V_P(i)) >> k_P(i))
22:       3. Calculate the logarithm: The normalizing constant may be expressed in its floating
         point representation norm=norm_{mant} · 2^{normexp} . The logarithm is applied to the variable norm,
         and ln(norm)=ln(norm_{mant} · 2^{normexp})=ln(norm_{mant})+ ln(2^{normexp} )= ln(2^{normexp} )+ 2.
         lnCORDIC(norm_{mant}). In this example, mantissa may be a number between 0.10... and 0.11...,
         meaning that it will be ∈ [0.5, 1), making the input range of the lnCORDIC(norm_{mant}) func-
         tion
``` work with the condition $\sum_{i=1}^{+\infty} \phi_i \geq 1.$

```
23:        level 1 ← -2· lnCORDIC(norm_mant)
24:        level 2 ← -norm_exp
25:   4. Calculate the second exponential: the input will be V_P(i) + lnval1. The
      variable val1 may achieve a maximum value of ln(2), and the input range of the exponential
      function expCORDIC may go up to I +ln(2), and the new condition for φ_i may become
```

$$\sum_{i=1}^{+\infty} \phi_i \geq 1 + \ln(2).$$

The values in the variables $x_{SF}$ will be the output of SoftMax.

```
26:        V_SF ← 0
27:        for ( i = 1; i ≤ n;i + + ) do
28:            V_P(i) ← expCORDIC (V_P(i) + lnval1)
29:            k_P(i) ← k_P(i) + lnval2
30:            V_SF(i) ← (V_P(i) << k_P(i))
```

The following exemplary sequences are defined for a number of CORDIC iterations equal to, for example, 12. Other sequences may be used as long as the previously mentioned three conditions are satisfied.

$$\vec{\theta} = [0, 1, 0, 1, 0, 0, 1, 0, 0, 1, 0, 1]$$

$$\vec{f} = \left[\frac{1}{2}, \frac{1}{4} + \frac{1}{8}, \frac{1}{4}, \frac{1}{8} + \frac{1}{16}, \frac{1}{8}, \frac{1}{16}, \right.$$
$$\left. \frac{1}{32} + \frac{1}{64}, \frac{1}{32}, \frac{1}{64}, \frac{1}{128} + \frac{1}{256}, \frac{1}{128}, \frac{1}{256} + \frac{1}{512}\right]$$

$$\vec{\phi} = [0.5493, 0.3942, 0.2552, 0.1897, 0.1257, 0.0626 \ldots,$$
$$0.0469, 0.0313, 0.0156, 0.0117, 0.0078, 0.0059]$$

$$\vec{\epsilon} = [0, 0, 1, 1, 2, 2, 2, 3, 3, 3, 4, 4]$$

$$\vec{V} = (-3.73, 4.13, 1.32, -4.02, 2.21, 0.46, 4.57, 2.64, -3.42, 3.00)$$

The method to calculate SoftMax is explained step by step. In the first step, input vectors are transformed. By iteratively subtracting ln(2), the new format of vectors are obtained. For example, $V_p(1)+k_p(1)\ln(2)=-0.2643-5*\ln 2=-3.72=V(1)$. $\vec{V}_p=[-0.2643, 0.6643, 0.6269, -0.5543, 0.1306, 0.4600, 0.4111, 0.5606, -0.6474, 0.2274]$, $\vec{k}_p=[-5, 5, 1, -5, 3, 0, 6, 3, -4, 4]$.

Then, a first exponential function is used to calculate the normalizing factor. The exponential calculation will be shown for the first element of $\vec{V}_p$ and $\vec{k}_p$. The $z_{state}$ is set to $V_p(1)=-0.2643$.

1: $z_{state} \geq 0$, θ(i)=0, iter=1,
   $xy_{state}=xy_{state}+(xy_{state}>>\text{iter}+\epsilon(j))=1-(1>>1+0)=1.5$
   $z_{state}=z_{state}-\phi(j)=0.22741-0.54931=-0.32189$
2: $z_{state}<0$, θ(i)=1, iter=2,
   $xy_{state}=xy_{state}-(xy_{state}>>\text{iter}-\epsilon(j))-(xy_{state}>>\text{iter}+1-\epsilon(j))$
   $=1.5-(1.5>>2-0)-(1.5>>2+1-0)=0.9375$
   $z_{state}=z_{state}+\phi(j)=-0.32189+0.39423=0.072334$
3: $z_{state} \geq 0$, θ(i)=0, iter=3,
   $xy_{state}=xy_{state}+(xy_{state}>>\text{iter}-\epsilon(j))=0.9375-(0.9375>>3+1)=1.1719$
   $z_{state}=z_{state}-\phi(j)=0.072334-0.25541=-0.18308$
4: $z_{state}<0$, θ(i)=1, iter=4,
   $xy_{state}=xy_{state}-(xy_{state}>>\text{iter}-\epsilon(j))-(xy_{state}>>\text{iter}+1-\epsilon(j))$
   $=1.1719-(1.1719>>4-1)-(1.1719>>4+1-1)=0.95215$
   $z_{state}=z_{state}+\phi(j)=-0.18308+0.18974=0.0066658$
5: $z_{state} \geq 0$, θ(i)=0, iter=5,
   $xy_{state}=xy_{state}+(xy_{state}>>\text{iter}-\epsilon(j))=0.95215>>5+2)=1.0712$
   $z_{state}=z_{state}-\phi(j)=0.0066658-0.12566=-0.11899$
6: $z_{state}<0$, θ(i)=0, iter=6,
   $xy_{state}=xy_{state}-(xy_{state}>>\text{iter}-\epsilon(j))=1.0712-(1.0712>>6-2)=1.0042$
   $z_{state}=z_{state}+\phi(j)=-0.11899+0.0.6582=-0.05641$
7: $z_{state}<0$, θ(i)=1, iter=7,
   $xy_{state}=xy_{state}-(xy_{state}>>\text{iter}-\epsilon(j))-(xy_{state}>>\text{iter}+1-\epsilon(j))$
   $=1.0042-(1.0042>>7-2)-(1.0042>>7+1-2)=0.95715$
   $z_{state}=z_{state}+\phi(j)=-0.05641+0.046909=-0.0095005$
8: $z_{state}<0$, φ(i)=0, iter=8,
   $xy_{state}=xy_{state}-(xy_{state}>>\text{iter}-\epsilon(j))=0.95715-(0.95715>>8-3)=0.92724$
   $z_{state}=z_{state}+\phi(j)=-0.0095005+0.03126=0.02176$
9: $z_{state} \geq 0$, θ(i)=0, iter=9,
   $xy_{state}=xy_{state}+(xy_{state}>>\text{iter}-\epsilon(j))=0.92724-(0.92724>>9+3)=0.94172$
   $z_{state}=z_{state}-\phi(j)=0.02176-0.015626=0.0061335$
10: $z_{state} \geq 0$, θ(i)=0, iter=10,
    $xy_{state}=xy_{state}+(xy_{state}>>\text{iter}-\epsilon(j\ ))+(xy_{state}>>\text{iter}+1-\epsilon(j))=0.94172+(0.94172>>10-1-3)=0.95276$
    $z_{state}=z_{state}-\phi(j)=0.0061335-0.011719=-0.0055858$
11: $z_{state}<0$, θ(i)=0, iter=11,
    $xy_{state}=xy_{state}-(xy_{state}>>\text{iter}-\epsilon(j))=0.95276-(0.95276>>11-4)=$0.94532
    $z_{state}=z_{state}+\phi(j)=-0.0055858+0.0078127=0.0022268$
12: $z_{state} \geq 0$, θ(i)=0, iter=12,
    $xy_{state}=xy_{state}+(xy_{state}>>\text{iter}-\epsilon(j))+(xy_{state}>>\text{iter}+1-\epsilon(j))=0.94532+(0.94532>>12-4)+(0.94532>>12+1-4)=0.95085$
    $z_{state}=z_{state}-\phi(j)=0.0022268-0.0058594=-0.0036326$ In the last iteration, $xy_{state}=0.58057$, which, if multiplied by An=1.3250, is very close to the value $e^{-0.2643}$. The output of the exponential calculation with CORDIC is: expCORDIC $(\vec{V}_p)=[0.58057, 1.4677, 1.4059, 0.4347, 0.86031, 1.1965, 1.1417, 1.3257, 0.39573, 0.39573]$. The resulting normalizing value when adding up all the elements of expCORDIC($\vec{V}_p$) is 156.7983, for which $\text{norm}_{exp}=8$, and $\text{norm}_{mant}=0.61249$.

Then, the logarithm is calculated:
1: $y_{state} \geq 0$, θ(i)=0, iter=1,
   $x_{state}=x_{state}+(y_{state}>>\text{iter}-\epsilon(j))=1.6125+(-0.38751>>1-0)=1.4187$
   $y_{state}=y_{state}+(x_{state}>>\text{iter}-\epsilon(j))=-0.38751+(1.6125>>1-0)=0.41874$
   $z_{state}=z_{state}-\phi(j)=0-0.54931=-0.54931$ 2: $y_{state}>0$, θ(i)=1, iter=2,
  $x_{state}=x_{state}-(y_{state}>>\text{iter}-\epsilon(j))-(y_{state}>>\text{iter}+1-\epsilon(j))$
    $=1.4187+(0.32186>>2-0)-(0.32186>>2+1-0)=1.298$,
  $y_{state}=y_{state}-(x_{state}>>\text{iter}-\epsilon(j))-(x_{state}>>\text{iter}+1-\epsilon(j))=0.32186+(1.4187>>2-0)-(1.4187>>2+1-0)=-0.21016$
  $z_{state}=z_{state}+\phi(j)=-0.54931+0.39423=-0.15508$
3: $y_{state}\leq 0$, θ(i)=0, iter=3,
  $x_{state}=x_{state}+(y_{state}>>\text{iter}-\epsilon(j))=1.298+(-0.1649>>3-1)=1.2568$,
  $y_{state}=y_{state}+(x_{state}>>\text{iter}-\epsilon(j))=-0.1649+(1.298>>3-1)=0.15961$
  $z_{state}=z_{state}-\phi(j)=0.15508-0.25541=-0.41049$
4: $y_{state}>0$, θ(i)=1, iter=4,
  $x_{state}=x_{state}-(y_{state}>>\text{iter}-\epsilon(j))-(y_{state}>>\text{iter}+1-\epsilon(j))$
    $=1.2568-(0.1493>>4-1)-(0.1493>>4+1-1)=1.2288$,
  $y_{state}=y_{state}-(x_{state}>>\text{iter}-\epsilon(j))-(x_{state}>>\text{iter}+1-\epsilon(j))=0.1493+(1.2568>>4-1)-(0.1493>>4+1-1)=-0.086351$
  $z_{state}=z_{state}+\phi(j)=-0.41049+0.18974=-0.22075$
5: $y_{state}\leq 0$, θ(i)=0, iter=5,
  $x_{state}=x_{state}+(y_{state}>>\text{iter}-\epsilon(j))=1.2288+(-0.081102>>5-2)=1.2187$,
  $y_{state}=y_{state}+(x_{state}>>\text{iter}-\epsilon(j))=-0.081102+(1.2288>>5-2)=0.072501$
  $z_{state}=z_{state}-\phi(j)=-0.22075-0.12566=-0.3464$
6: $y_{state}<0$, θ(i)=0, iter=6,
  $x_{state}=x_{state}-(y_{state}>>\text{iter}-\epsilon(j))=1.2187-(-0.071233>>6-2)=1.2142$,
  $y_{state}=y_{state}-(x_{state}>>\text{iter}-\epsilon(j))=-0.071233+(1.2187>>6-2)=-0.0049343$
  $z_{state}=z_{state}+\phi(j)=-0.3464+0.062582=-0.28382$
7: $y_{state}\leq 0$, θ(i)=1, iter=7,
  $x_{state}=x_{state}-(y_{state}>>\text{iter}-\epsilon(j))+(y_{state}>>\text{iter}+1-\epsilon(j))=1.2142+(-0.004656>>7-2)+(-0.004656>>7+1-2)=1.214$,
  $y_{state}=y_{state}+(x_{state}>>\text{iter}-\epsilon(j))+(x_{state}>>\text{iter}+1-\epsilon(j))=-0.004656+(1.2142>>7-2)+(1.2142>>7+1-2)=0.052261$
  $z_{state}=z_{state}+\phi(j)=-0.28382-0.046909=-0.33073$
8: $y_{state}<0$, θ(i)=0, iter=8,
  $x_{state}=x_{state}-(y_{state}>>\text{iter}-\epsilon(j))=1.214-(0.052251>>8-3)=1.21242$,
  $y_{state}=y_{state}-(x_{state}>>\text{iter}-\epsilon(j))=0.52251+(1.214>>8-3)=0.014313$
  $z_{state}=z_{state}+\phi(j)=-0.33073+0.03126=-0.29947$
9: $y_{state}<0$, θ(i)=0, iter=9,
  $x_{state}=x_{state}-(y_{state}>>\text{iter}-\epsilon(j))=1.2124-(0.014364>>9-3)=1.2122$,
  $y_{state}=y_{state}-(x_{state}>>\text{iter}-\epsilon(j))=0.014364+(1.2124>>9-3)=-0.0045795$
  $z_{state}=z_{state}+\phi(j)=-0.29947+0.015626=-0.28384$
10: $y_{state}\leq 0$, θ(i)=1, iter=10,
  $x_{state}=x_{state}-(y_{state}>>\text{iter}-\epsilon(j))+(y_{state}>>\text{iter}+1-\epsilon(j))=1.2122+(-0.004576>>10-3)+(-0.004576>>10+1-3)=1.2121$,
  $y_{state}=y_{state}+(x_{state}>>\text{iter}-\epsilon(j))+(x_{state}>>\text{iter}+1-\epsilon(j))=-0.004576+(1.2122>>10-3)+(1.2122>>10+1-3)=0.009629$
  $z_{state}=z_{state}+\phi(j)=-0.28384-0.011719=-0.29556$
11: $y_{state}<0$, θ(i)=0, iter=11,
  $x_{state}=x_{state}-(y_{state}>>\text{iter}-\epsilon(j))=1.2121-(0.096283>>11-4)=1.212$,
  $y_{state}=y_{state}-(x_{state}>>\text{iter}-\epsilon(j))=0.096283+(1.2121>>11-4)=0.00015878$
  $z_{state}=z_{state}+\phi(j)=-0.29556+0.0078127=-0.28775$ 12: $y_{state}<0$, θ(i)=0, iter=12,
  $x_{state}=x_{state}-(y_{state}>>\text{iter}-\epsilon(j))-(y_{state}>>\text{iter}+1-\epsilon(j))=1.212-(0.00015937>>12-4)-(0.00015937>>12+1-4)=1.212$,
  $y_{state}=y_{state}-(x_{state}>>\text{iter}-\epsilon(j))-(x_{state}>>\text{iter}+1-\epsilon(j))=-0.00015937-(1.212>>12-4)-(1.212>>12+1-4)=0.0069424$
  $z_{state}=z_{state}+\phi(j)=-0.28775+0.00585949=-0.28189$ The two values of interest at this step are lnval1=−2 norm$_{mant}$=−2*(−0.28189)=0.56378, and lnval2=−norm$_{exp}$=−8. Then, the second exponential calculation is briefly discussed. First, lnval1=0.56378 is added to all the elements of $\vec{V}_p$, resulting in [0.2995, 1.2280, 1.1906, 0.0095, 1.0238, 0.9749, 1.1243, −0.0836, 0.7912]. Then, the exponential of the modified elements of $\vec{V}_p$ are calculated using the expCORDIC approach, resulting in [1.0202, 2.5915, 2.4749, 0.7613, 1.5189, 2.1001, 2.0096, 2.3248, 0.6973, 1.6684]. The value lnval2=−norm$_{exp}$=−8 is then added to all of the elements of $\vec{k}_p$, resulting in [−13, −3, −7, −13, −5, −8, −2, −5, −12, −4]. Finally, every element of the expCORDIC approach is shifted to the right by the amount shown in the following corresponding value [0.0001, 0.3239, 0.0193, 0.0001, 0.0475, 0.0082, 0.5024, 0.0726, 0.0002, 0.1043], resulting in the final SoftMax output, the SoftMax function may be calculated with an accuracy set by the number of CORDIC iterations. Thus, the types of operations executed by the processing engine to accurately perform a very complicated function are simple (e.g., add, subtract, shifts), no multiplications or divisions are needed.

An example to implement the modified-CORDIC method in hardware is also discussed. First, the calculation of the exponential function is shown. The restrictions mentioned in equation 26 are applied to the input value, which is that a value $$\epsilon \left( -\sum_{i=k}^{+\infty} \phi_i, \sum_{i=k}^{+\infty} \phi_i \right).$$

The same parameters mentioned in the software implementation may be used here. In this depicted example, the values in vector $\vec{\phi}$ have been scaled and rounded so that the vector may be represented in 12 bits.

$\vec{\theta}=[0,1,0,1,0,0,1,0,0,1,0,1]$ $\vec{\phi}=[2250,1615,1046,777,515,256,192,128,64,48,32,24]$ $\vec{\epsilon}=[0,0,1,1,2,2,2,3,3,3,4,4]$ A first pipelined architecture (e.g., the RME1 220) may be used for the calculation of the exponential function using N number of steps in rotation mode. According to the value of θ, different unit cells with different shifters may be used. In some embodiments, the first pipelined architecture may be further optimized to utilize each of the stage multiple times, limiting the pipelined throughput capability, but reducing the amount of hardware resources used. In this depicted example, 12 bits is chosen to be the number of bits representing the $\vec{\phi}$, which is the total number of pipelined stages in the first pipelined architecture and the resolution of the input values. When an input value 3710 (Zin) is applied to the RME1 220, which represents the value 0.9058, the calculation happened in each stage of the first piped architecture is discussed for the chosen input value. The values of X and Y will change in every iteration, and in this depicted example, X will always be equal to Y in the calculation of the exponential using rotation mode. Thus, in the following example, X and Y have been collapsed into XY.

1: stage i=1, $\theta_1$=0, $xy_1$=4096, $z_1$=3710
First Shift to the right, with i-$\epsilon$(i)=1, $xy_1$>>1=2048
Because $z_1$>0, $xy_2$⇐$xy_1$+2048=6144, $z_2$⇐$z_1$-$\phi_1$=3710-2249=1461
2: stage i=2, $\theta_2$=1, $xy_2$=6144, $z_2$=1461
First Shift to the right, with i-$\epsilon$(i)+1=3 and i-$\epsilon$(i)=2, $xy_2$>>3+$xy_2$>>2=2304
Because $z_2$>0, $xy_3$⇐$xy_2$+2304=8448, $z_3$⇐$z_2$-$\phi_2$=1461-1614=-153
3: stage i=3, $\theta_3$=0, $xy_3$=8448, $z_3$=-153
First Shift to the right, with i-$\epsilon$(i)+2, $xy_3$>>2=2112
Because $z_3$>0, $xy_4$⇐$xy_3$-2122=6336, $z_4$⇐$z_3$+$\phi_3$=-153+1046=893
4: stage i=4, $\theta_4$=0, $xy_4$=6336, $z_4$=893
First Shift to the right, with i-$\epsilon$(i)+1=4, i-$\epsilon$(i)=3, $xy_4$>>4+$xy_4$>>3=1188
Because $z_4$>0, $xy_5$⇐$xy_4$+1188=7524, $z_5$⇐$z_4$-$\phi_4$=893-777=116
5: stage i=5, $\theta_5$=0, $xy_5$=4096, $z_5$=3710
First Shift to the right, with i-$\epsilon$(i)=3, $xy_5$>>3=940
Because $z_5$>0, $xy_6$⇐$xy_5$+940=8464, $z_6$⇐$z_5$-$\phi_5$=116-514=-398
6: stage i=6, $\theta_6$=0, $xy_6$=8464, $z_6$=-398
First Shift to the right, with i-$\epsilon$(i)=4, $xy_6$>>4=529
Because $z_6$<0, $xy_7$⇐$xy_6$-529=7935, $z_7$⇐$z_6$+$\phi_6$=-398+256=-142
7: stage i=7, $\theta_7$=0, $xy_7$=7935, $z_7$=-142
First Shift to the right, with i-$\epsilon$(i)+1=6 and i-$\epsilon$(i)=5, $xy_7$>>6+$xy_7$=370
Because $z_7$<0, $xy_8$⇐$xy_7$-370=7565, $z_8$⇐$z_7$+$\phi_7$=-142+192=5-
8: stage i=8, $\theta_8$=0, $xy_8$=7565, $z_8$=50
First Shift to the right, with i-$\epsilon$(i)=5, $xy_8$>>5=236
Because $z_8$>0, $xy_9$⇐$xy_8$+236=7801, $z_9$⇐$z_8$-$\phi_8$=50-128=-78
9: stage i=9, $\theta_9$=0, $xy_9$=7801, $z_9$=-78
First Shift to the right, with i-$\epsilon$(i)=6, $xy_9$>>6=121
Because $z_9$<0, $xy_{10}$⇐$xy_9$-121=7680, $z_{10}$⇐$z_9$+$\phi_9$=-78+64=-14
10: stage i=10, $\theta_{10}$=1, $xy_{10}$=7680, $z_{10}$=-14
First Shift to the right, with i-$\epsilon$(i)+1=8 and i-$\epsilon$(i)=7, $xy_{10}$>>8+$xy_{10}$>>7=90
Because $z_{10}$<0, $xy_{11}$⇐$xy_{10}$-90=7590, $z_{11}$⇐$z_{10}$+$\phi_{10}$=-14+48=34
11: stage i=11, $\theta_{11}$=0, $xy_{11}$=7590, $z_{11}$=34
First Shift to the right, with i-$\epsilon$(i)=7, $xy_{11}$>>7=59
Because $z_{11}$>0, $xy_{12}$⇐$xy_{11}$+59=7649, $z_{12}$⇐$z_{11}$-$\phi_{11}$=34-32=2
12: stage i=12, $\theta_{12}$=0, $xy_{12}$=7649, $z_{12}$=2
First Shift to the right, with i-$\epsilon$(i)+1=9 and i-$\epsilon$(i)=8, $xy_{12}$>>9+$xy_{12}$>>8=43
Because $z_{12}$>0, $xy_{13}$⇐$xy_{12}$+43=7692, $z_{13}$⇐$z_{12}$-$\phi_{12}$=2-24=-22

The final output value of the first pipelined architecture is 7692, which represents 1.8779, and if it is multiplied by An=1.3250, the value obtained is 2.4483≈$e^{0.9058}$. A second pipelined architecture (e.g., the VME 240) is implemented in the calculation of the natural logarithm. The constraints on the input values are shown in equation 27, which dictates that the input value is $$\in (e^{2\sum_{i=k}^{+\infty}\phi_i}, e^{2\sum_{i=k}^{+\infty}\phi_i}).$$

According to the value of 0, different unit cells may be used. In this depicted example, the same number of iterations is used, with the input represented with 12 bits. When an input value 0.8003 is applied to the second pipelined architecture, which represents the value 3278 in 12 bits, the calculation happened in each stage of the second piped architecture is discussed for the chosen input value. $x_1$=7374, $y_1$=-818.

1: stage i=1, $\theta_1$=0, $x_1$=7374, $y_1$=-818, $z_1$=0
First Shift to the right, with i-$\epsilon$(i)=1, $x_1$>>1=3678, $y_1$>>1=-409
Because $y_1$<0, $x_2$⇐$x_1$-409=6965, $y_2$⇐$y_1$+3678=2869, $z_2$⇐$z_1$-$\phi_1$=0-2249=-2249
2: stage i=2, $\theta_2$=1, $x_2$=6965, $y_2$=2869, $z_2$=-2249
First Shift to the right, with i-$\epsilon$(i)+1=3 and i-$\epsilon$(i)=2, $x_2$>>3+$x_2$>>2=2611, $y_2$>>3+$y_2$>>2=1075
Because $y_2$≥0, $x_3$⇐$x_2$-1075=5890, $y_3$⇐$y_2$-2611=258, $z_3$⇐$z_2$+$\phi_2$=-2249+1614=-635
3: stage i=3, $\theta_3$=0, $x_3$=5890, $y_3$=258, $z_3$=-635
First Shift to the right, with i-$\epsilon$(i)+2, $x_3$>>2=1472, $y_3$>>2=64
Because $y_3$≥0, $x_4$⇐$x_3$-64=5826, $y_4$⇐$y_3$-1472=-1214, $z_4$⇐$z_3$+$\phi_3$=-635+1046=411
4: stage i=4, $\theta_4$=0, $x_4$=5826, $y_4$=-1214, $z_4$=411
First Shift to the right, with i-$\epsilon$(i)+1=4 and i-$\epsilon$(i)=3, $x_4$>>4+$x_4$>>3=1092, $y_4$>>4+$y_4$>>3=-228
Because $y_4$<0, $x_5$⇐$x_4$-228=5598, $y_5$⇐$y_4$+1092=-122, $z_5$⇐$z_4$-$\phi_4$=411-777=-366
5: stage i=5, $\theta_5$=0, $x_5$=5598, $y_5$=-366, $z_1$=0
First Shift to the right, with i-$\epsilon$(i)=3, $x_5$>>3=699, $y_5$>>3=-16
Because $y_5$<0, $x_6$⇐$x_5$-16=5582, $y_6$⇐$y_5$699=577, $z_6$⇐$z_5$-$\phi_5$=-366-514=-880
6: stage i=6, $\theta_6$=0, $x_6$=5582, $y_6$=577, $z_6$=-880
First Shift to the right, with i-$\epsilon$(i)=4, $x_6$>>4=348, $y_6$>>4=36
Because $y_6$≥0, $x_7$⇐$xy_6$-36=5546, $y_7$⇐$y_6$-348=229, $z_7$⇐$z_6$+$\phi_6$=-880+256=-624
7: stage i=7, $\theta_7$=0, $x_7$=5546, $y_7$=229, $z_1$=-624
First Shift to the right, with i-$\epsilon$(i)+1=6 and i-$\epsilon$(i)=5, $x_7$>>6+$x_7$>>5=259, $y_7$>>6+$y_7$>>5=10
Because $y_7$≥0, $x_8$⇐$x_7$-10=5536, $y_8$⇐$y_7$-259=-30, $z_8$⇐$z_7$+$\phi_7$=-624+192=-432
8: stage i=8, $\theta_8$=0, $x_8$=5536, $y_8$=-30, $z_8$=-432
First Shift to the right, with i-$\epsilon$(i)=5, $x_8$>>5=173, $y_8$>>5=-1
Because $y_8$<0, $x_9$⇐$x_8$-1=5535, $y_9$⇐$y_8$+173=143, $z_9$⇐$z_8$-$\phi_8$=-432-128=-560
9: stage i=9, $\theta_9$=0, $x_9$=5535, $y_9$=143, $z_9$=-560
First Shift to the right, with i-$\epsilon$(i)=6, $x_9$>>6=86, $y_9$>>6=2
Because $y_9$≥0, $x_{10}$⇐$x_9$-2=5533, $y_{10}$⇐$y_9$-86=57, $z_{10}$⇐$z_9$+$\phi_9$=-560+64=-496
10: stage i=10, $\theta_{10}$=1, $x_{10}$=5533, $y_{10}$=57, $z_{10}$=-496
First Shift to the right, with i-$\epsilon$(i)+1=8 and i-$\epsilon$(i)=7, $x_{10}$>>8+$x_{10}$>>7=64, $y_{10}$>>8+$y_{10}$>>7=0
Because $y_{10}$≥0, $x_{11}$⇐$x_{10}$-0=5533, $y_{11}$⇐$y_{10}$-64=-7, $z_{11}$⇐$z_{10}$+$\phi_{10}$=-496+48=-448
11: stage i=11, $\theta_{11}$=0, $x_{11}$=5533, $y_{11}$=-7, $z_{11}$=-448
First Shift to the right, with i-$\epsilon$(i)=7, $x_{11}$>>7=43, $y_{11}$>>7=-1
Because $y_{11}$<0, $x_{12}$⇐$x_{11}$-1=5532, $y_{12}$⇐$y_{11}$+43=36, $z_{12}$⇐$z_{11}$-$\phi_{11}$=-448-32=-480
12: stage i=12, $\theta_{12}$=1, $x_{12}$=5532, $y_{12}$=36, $z_{12}$=-480
First Shift to the right, with i-$\epsilon$(i)+1=9 and i-$\epsilon$(i)=8, $x_{12}$>>9+$x_{12}$>>8=31, $y_{12}$>>9+$y_{12}$>>8=0

Because $y_{12} \geq 0$, $x_{13} \Leftarrow x_{12} - 0 = 5532$, $y_{13} \Leftarrow y_{12} - 31 = 5$, $z_{13} \Leftarrow z_{12} + \phi_{12} = -480 + 24 = -456$ The final output value of the second pipelined architecture is −456, which represents −0.1113, and if it is multiplied by 2, the value obtained is −0.222≈ln (0.8003). As the exponential and the logarithm implementations share lots of hardware resources, an architecture (e.g., a hybrid architecture) programmable for any of the two function approximations may be used. Then, the calculation of SoftMax in hardware (e.g., the architecture disclosed in FIG. 6) is discussed. At Step 1, the input resolution may be selected as $K_{int}=4$ bits and $K_{frac}=16$ bits, the input vector values are selected the same as the ones used in the software implementation, which have been rounded to the chosen precision bits. The value of Cint is chosen to be 12.

$\vec{V}$=(−244449, 270664, 86508, −263455, 144835, 30147, 299500, 173015, −224133, 196609)/$2^{16}$=(−3.7300, 4.1300, 1.3200, −4.0200, 2.2100, 0.4600, 4.5700, 2.6400, −3.4200, 3.0000). The value ln2 will be quantized using 24 bits, with a value of 11629080/$2^{24}$. By transforming the input vector, the resulting values (e.g., the transformed values $V_{pi}$ and $k_i$) may be stored in memory (e.g., the memory 330), shown in Table 1.

TABLE 1

| $V_{pi}$ | Represented $V_{pi}$ | $k_i$ |
|---|---|---|
| −17319 | −0.2643 | −5 |
| 43534 | 0.6643 | 5 |
| 41082 | 0.6249 | 1 |
| −36325 | −0.5543 | −5 |
| 8557 | 0.1306 | 3 |
| 30147 | 0.4600 | 0 |
| 26943 | 0.4111 | 6 |
| 36737 | 0.5606 | 3 |
| −42429 | −0.6474 | −4 |
| 14904 | 0.2274 | 4 |

At Step 2, the RME1 may be used. In some embodiments, the hybrid architecture may be configured in rotation mode to perform the rotation. In this step, only the $\vec{V}_p$ values may be transformed, with the $\vec{k}$ values left untouched until the floating point adder is reached. The same parameters as in the case of the exponential and logarithm calculation may be used, and the $\vec{\phi}$ values will be represented with 16 bits.

$\vec{\theta}$=[0,1,0,1,0,0,1,0,0,1,0,1]

$\vec{\phi}$=[35999,25836,16738,12435,8235,4101,3074,2048,1024,768,512,384]

$\vec{\in}$=[0,0,1,1,2,2,2,3,3,3,4,4]

The following results (shown in table 2) may be obtained after the exponential calculation is applied to the $\vec{V}_{pi}$ values.

TABLE 2

| $V_{pi}$ | $f_{exp}(v_{pi})$ | $k_i$ |
|---|---|---|
| −17319 | 37898 | −5 |
| 43534 | 96184 | 5 |
| 41082 | 92138 | 1 |
| −36325 | 28487 | −5 |
| 8557 | 56382 | 3 |
| 3-147 | 78416 | 0 |
| 26943 | 74822 | 6 |

TABLE 2-continued

| $V_{pi}$ | $f_{exp}(v_{pi})$ | $k_i$ |
|---|---|---|
| 36737 | 86882 | 3 |
| −42429 | 25933 | −4 |
| 14904 | 62317 | 4 |

At this point, the values for $f_{exp}(v_{pi})$ will then be transformed to make sure the values $f_{exp}(v_{pi})$ are kept in 16 bits precision, then, the calculation of the summation of all the values are calculated using a simple floating point adder (e.g., the floating point register 230). And the calculated mantissa=40189, and the calculated exponent=8. The method to calculate the mantissa and the exponent is shown in FIG. 7B. At Step 3, The mantissa in the floating point register is then sent through the second pipeline architecture (in Vectoring Mode) to calculate the logarithm. The value at the output of the second pipeline architecture will be −15910 for the mantissa value. Then the output of the second pipeline architecture is shifted to the left and the sign is changed to achieve the value 31820, 31820/$2^{16}$=0.4855≈ln (40189/$2^{16}$).

At Step 4, the values stored in the memory are streamed out, and all the $\vec{v}_{pL}$ values are added by the mantissa in the floating point register, and $\vec{k}$ is subtracted from the exponent in the floating point register. Because of the operation of the $\vec{v}_{pl}$ added the mantissa value, the integer part of the values sent to the third pipeline architecture (e.g., the architecture shown in FIG. 6) may not be 0. After performing a second exponential calculation, SoftMax output (shown in Table 3) may be obtained.

TABLE 3

| Values in Memory | | Added/subtracted | | SoftMax Output | |
|---|---|---|---|---|---|
| $v_{pi}$ | $k_i$ | $v_{pi}$ + mantissa | $k_i$ − exponent | mantissa | exponent |
| −17319 | −5 | 14501 | −13 | 61831 | −13 |
| 43534 | 5 | 75354 | −3 | 155983 | −3 |
| 41082 | 1 | 72902 | −7 | 150577 | −7 |
| −36325 | −5 | −4505 | −13 | 46240 | −13 |
| 8557 | 3 | 40377 | −5 | 91414 | −5 |
| 3-147 | 0 | 61967 | −8 | 127639 | −8 |
| 26943 | 6 | 58763 | −2 | 121169 | −2 |
| 36737 | 3 | 68557 | −5 | 141448 | −5 |
| −42429 | −4 | −10609 | −12 | 41835 | −12 |
| 14904 | 4 | 46724 | −4 | 100718 | −4 |

Figure 8A:
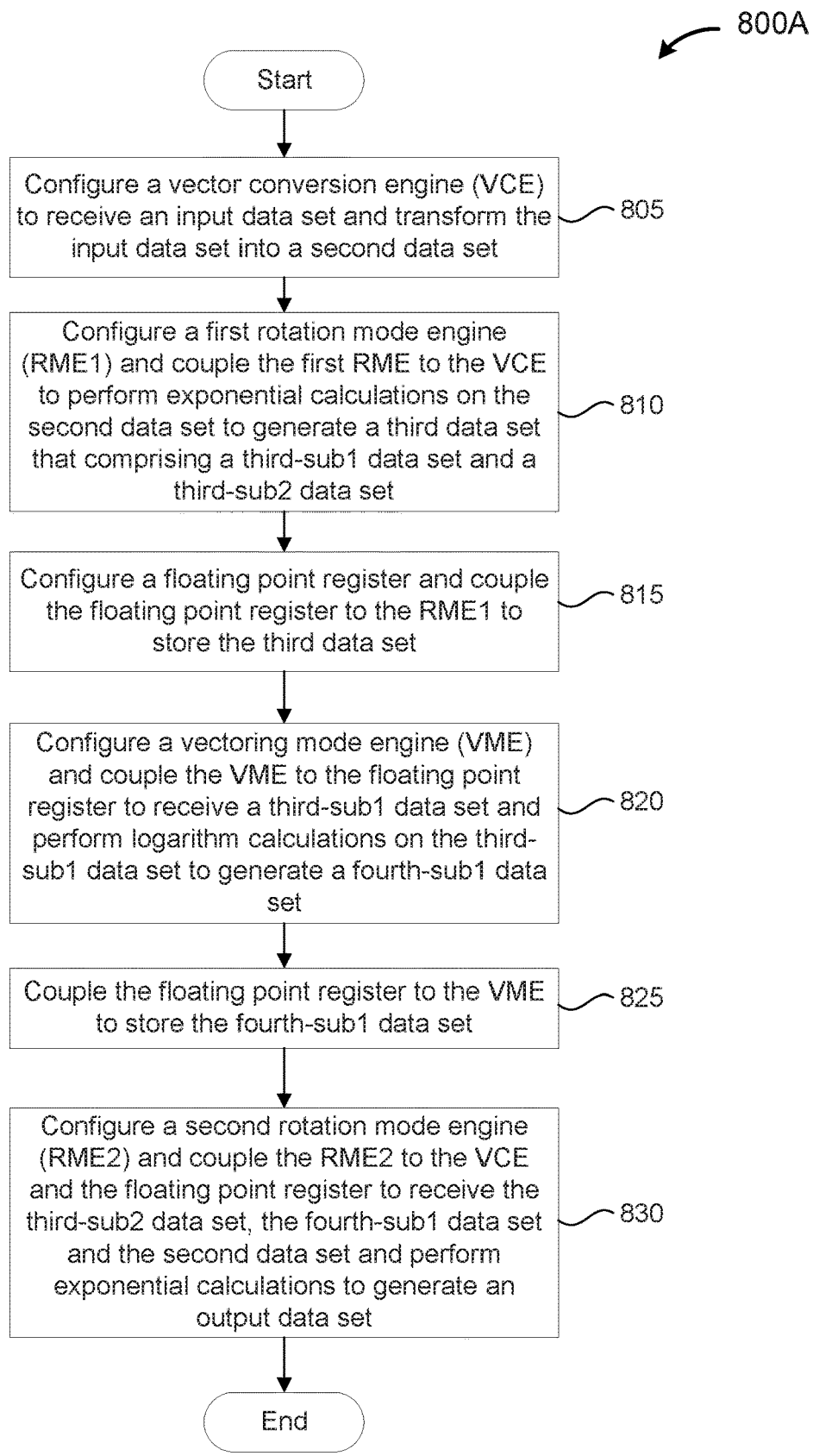
FIG. 8A depicts a flow chart of an exemplary design-time fabric reconfiguration method for a modified CORDIC engine.

FIG. 8A depicts a flow chart of an exemplary design-time fabric reconfiguration method for a modified CORDIC engine. An exemplary method 800A to obtain a modified CORDIC engine (e.g., the modified CORDIC engine 200) includes, at 805, configuring a vector conversion engine (e.g., the VCE 210) to receive an input vector V representative of a first data set (205) and transform each element $V_i$ of the input vector x into $V_i = V_{pi} + k_i \cdot \ln 2$ to generate a second data set (e.g., the second data set 215), $-1 \leq V_{pi} \leq 1$, and $k_i$ is an integer. The method 800A also includes, at 810, configuring a first rotation mode engine (e.g., the RME1 220) to receive the second data set 215 and perform exponential calculations on the second data set 215 to generate a third data set (e.g., the third data set 225) that includes a third-sub1 data set (e.g., the third-sub1 data set 225a) and a third-sub2 data set (e.g., the third-sub2 data set 225b).

The method 800A also includes, at 815, configuring a floating point register (e.g., the floating point register 230) and coupling the floating point register 230 to the RME1 220 to receive the third data set 225. The method 800A also includes, at 820, configuring a vectoring mode engine (e.g., the VME 240) and coupling the VME 240 to the floating point register 240 to receive the third-sub1 data set 225a and perform logarithm calculations on the third-sub1 data set 225a to generate a fourth-sub1 data set 235a.

The method 800A also includes, at 825, coupling the floating point register 230 to the VME 240 to store the fourth-sub1 data set 235a. The method 800A also includes, at 830, configuring a second RME (e.g., the RME2 250) and couple the RME2 220 to the VCE 210 and the floating point register 230 to receive the third-sub2 data set 225b, the fourth-sub1 data set 235a and the second data set 215 and perform exponential calculations to generate an output data set 255 that may be interpreted as a probability distribution of each element $V_i$ of the input vector V. Thus, by using the modified CORDIC method that mainly based on shifts and adds, and without the need of any multipliers, SoftMax calculations may be easily performed. Accordingly, the implementation of SoftMax calculations may advantageously reduce the cost of silicon area.

Figure 8B:
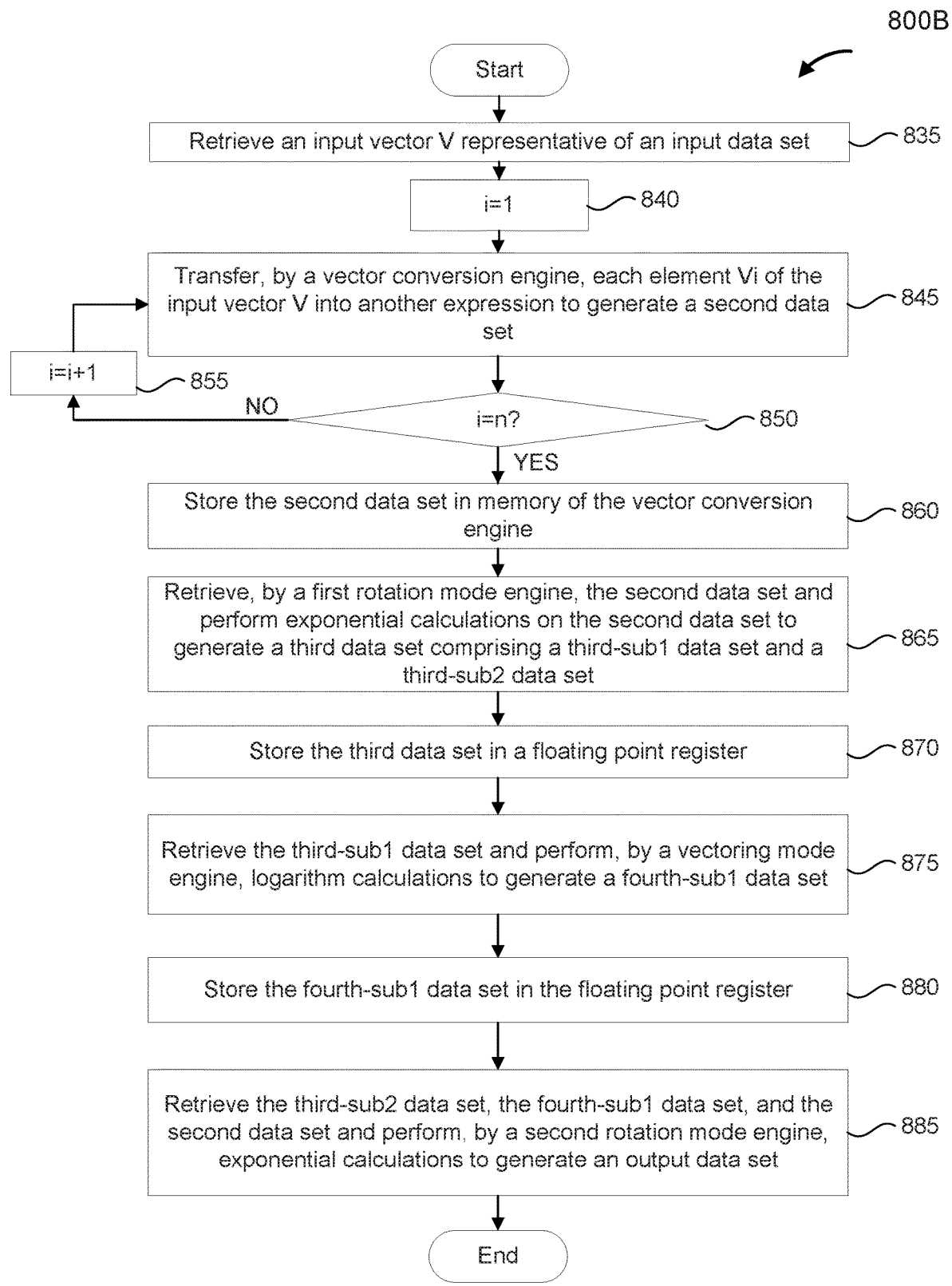
FIG. 8B depicts a flowchart of an exemplary run-time method for performing SoftMax calculation using a modified CORDIC engine.

FIG. 8B depicts a flowchart of an exemplary run-time method for performing SoftMax calculation using a modified CORDIC engine. An exemplary method 800B to operate the modified CORDIC engine 200, includes, at 835, retrieving an input vector V representative of an input data set. The method 800B also includes, at 840, introducing a variable i and initialize the variable i to 1. The method 800B also includes, at 845, transforming, by a vector conversion engine (e.g., the VCE 210), each element $V_i$ of the input vector V into another expression shown in equation 30 to generate a second data set (e.g., the second data set 215).

The method 800B also includes, at 850, determining (e.g., by the processor 723) whether i=n, n is the number of elements in the input vector V (whether each and every element $V_i$ in the input vector V has been transformed). If not all elements have been transformed, then the variable i is incremented at 855 and the method 800B loops back to 845. If all elements have been transformed, then the method 800B also includes, at 860, storing the second data set 215 in memory (e.g., memory 330) of the VCE 210.

The method 800B also includes, at 865, retrieving, by a first rotation mode engine (e.g., the RME1 220), the second data set 215 and performing exponential calculations on the second data set 215 to generate a third data set 225 comprising a third-sub1 data set 225a and a third-sub2 data set 225b, and at 870, storing the third data set 225 in a floating point register 230.

The method 800B also includes, at 875, retrieving the third-sub1 data set 225a and performing, by a vectoring mode engine (e.g., the VME 240), logarithm calculations to generate a fourth-sub1 data set 235a, and at 880, storing the fourth-sub1 data set 235a in the floating point register 230.

The method 800B also includes, at 885, retrieving the third-sub2 data set 225b, the fourth-sub1 data set 235a, and the second data set 215 and performing, by a second rotation mode engine (e.g., the RME2 250), exponential calculations to generate an output data set (e.g., the output data set 255). Thus, SoftMax calculations may be easily performed by using the modified CORDIC method that mainly based on shifts and adds, and without the need of any multipliers.

In this depicted example, the modified CORDIC engine 200 is arranged on a single integrated circuit. The integrated circuit may be a field programmable gate array (FPGA). In some embodiments, the modified CORDIC engine 200 may be implemented as hard block fixed circuitry. For example, an application specific integrated circuit (ASIC) may provide a modified CORDIC engine with customized hardware circuitry.

In some embodiments, some or all of the functions of modified CORDIC engine 200 may be implemented in a different integrated circuit. For example, the VCE 210 may be implemented in an ASIC, and the RME1 220 and the RME2 250 may be implemented in a FPGA.

In some embodiments, some or all of the functions of modified CORDIC engine 200 may be implemented in a processor that is configured to execute a set of instructions stored in a data store to perform SoftMax calculation. The processor may be arranged on the same integrated circuit with the data store. The data store may be implemented in a programmable logic block of a system-on-chip (SOC) or implemented in a hard block using fixed circuitry of the SOC.

Figure 9:
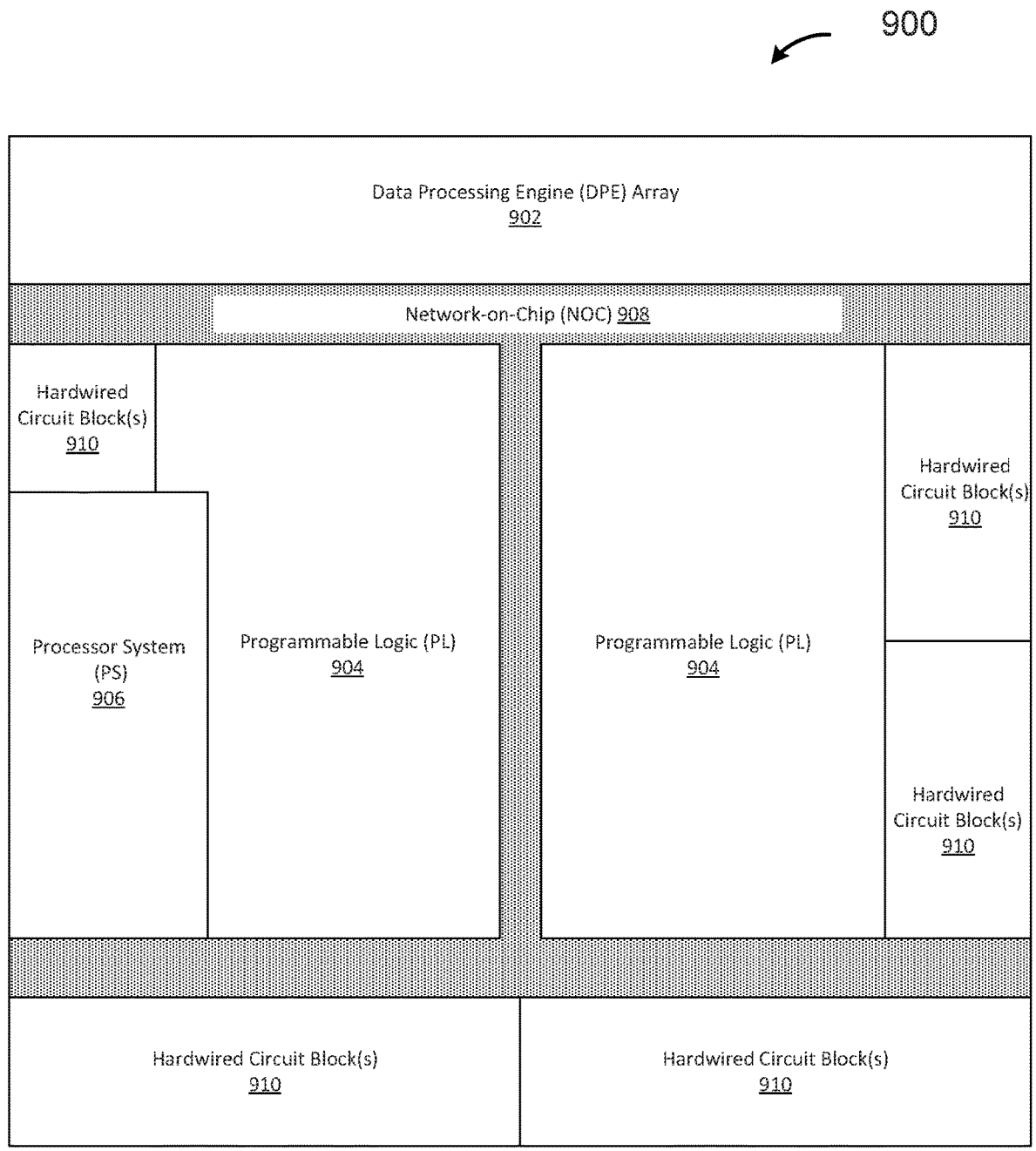
FIG. 9 illustrates an exemplary architecture for a System-on-Chip (SOC) on which the disclosed circuits and processes may be implemented.

FIG. 9 illustrates an exemplary architecture for a System-on-Chip (SOC). SOC 900 is an example of a programmable IC and an integrated programmable device platform. In the example of FIG. 9, the various, different subsystems or regions of the SOC 900 illustrated may be implemented on a single die provided within a single integrated package. In other examples, the different subsystems may be implemented on a plurality of interconnected dies provided as a single, integrated package.

In the example, the SOC 900 includes a plurality of regions having circuitry with different functionalities. In the example, the SOC 900 optionally includes a data processing engine (DPE) array 902. SOC 900 includes programmable logic (PL) regions 904 (hereafter PL region(s) or PL), a processing system (PS) 906, a Network on-Chip (NOC) 908, and one or more hardwired circuit blocks 910. DPE array 902 is implemented as a plurality of interconnected, hardwired, and programmable processors having an interface to the other regions of the SOC 900.

PL 904 is circuitry that may be programmed to perform specified functions. As an example, PL 904 may be implemented as field programmable gate array type of circuitry. PL 904 can include an array of programmable circuit blocks. Examples of programmable circuit blocks within PL 904 include, but are not limited to, configurable logic blocks (CLBs), dedicated random access memory blocks (BRAM and/or UltraRAM or URAM), digital signal processing blocks (DSPs), clock managers, and/or delay lock loops (DLLs).

Each programmable circuit block within PL 904 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

The PS 906 is implemented as hardwired circuitry that is fabricated as part of the SOC 900. The PS 906 may be implemented as, or include, any of a variety of different processor types each capable of executing program code. For example, PS 906 may be implemented as an individual processor, e.g., a single core capable of executing program code. In another example, PS 906 may be implemented as a multicore processor. In still another example, PS 906 may include one or more cores, modules, co-processors, interfaces, and/or other resources. PS 906 may be implemented using any of a variety of different types of architectures. Example architectures that may be used to implement PS 906 may include, but are not limited to, an ARM processor architecture, an x86 processor architecture, a GPU architecture, a mobile processor architecture, a DSP architecture, or other suitable architecture that is capable of executing computer-readable instructions or program code.

NOC 908 includes an interconnecting network for sharing data between endpoint circuits in SOC 900. The endpoint circuits can be disposed in DPE array 902, PL regions 904, PS 906, and/or in hardwired circuit blocks 910. NOC 908 can include high-speed data paths with dedicated switching. In an example, NOC 908 includes horizontal paths, vertical paths, or both horizontal and vertical paths. The arrangement and number of regions shown in FIG. 9 is merely an example. The NOC 908 is an example of the common infrastructure that is available within the SOC 900 to connect selected components and/or subsystems.

NOC 908 provides connectivity to PL 904, PS 906, and to selected ones of the hardwired circuit blocks 910. NOC 908 is programmable. In the case of a programmable NOC used with other programmable circuitry, the nets that are to be routed through NOC 908 are unknown until a user circuit design is created for implementation within the SOC 900. NOC 908 may be programmed by loading configuration data into internal configuration registers that define how elements within NOC 908 such as switches and interfaces are configured and operate to pass data from switch to switch and among the NOC interfaces.

NOC 908 is fabricated as part of the SOC 900 and while not physically modifiable, may be programmed to establish connectivity between different master circuits and different slave circuits of a user circuit design. NOC 908, for example, may include a plurality of programmable switches that are capable of establishing packet switched network connecting user specified master circuits and slave circuits. In this regard, NOC 908 is capable of adapting to different circuit designs, where each different circuit design has different combinations of master circuits and slave circuits implemented at different locations in the SOC 900 that may be coupled by NOC 908. NOC 908 may be programmed to route data, e.g., application data and/or configuration data, among the master and slave circuits of the user circuit design. For example, NOC 908 may be programmed to couple different user-specified circuitry implemented within PL 904 with PS 906, and/or DPE array 902, with different hardwired circuit blocks, and/or with different circuits and/or systems external to the SOC 900.

The hardwired circuit blocks 910 may include input/output (I/O) blocks, and/or transceivers for sending and receiving signals to circuits and/or systems external to SOC 900, memory controllers, or the like. Examples of different I/O blocks may include single-ended and pseudo differential I/Os and high-speed differentially clocked transceivers. Further, the hardwired circuit blocks 910 may be implemented to perform specific functions. Examples of hardwired circuit blocks 910 include, but are not limited to, cryptographic engines, digital-to-analog converters, analog-to-digital converters, and the like. The hardwired circuit blocks 910 within the SOC 900 may be referred to herein from time-to-time as application-specific blocks.

In the example of FIG. 9, PL 904 is shown in two separate regions. In another example, PL 904 may be implemented as a unified region of programmable circuitry. In still another example, PL 904 may be implemented as more than two different regions of programmable circuitry. The particular organization of PL 904 is not intended as a limitation. In this regard, SOC 900 includes one or more PL regions 904, PS 906, and NOC 908. DPE array 902 may be optionally included.

In other example implementations, the SOC 900 may include two or more DPE arrays 902 located in different regions of the IC. In still other examples, the SOC 900 may be implemented as a multi-die IC. In that case, each subsystem may be implemented on a different die. The different dies may be communicatively linked using any of a variety of available multi-die IC technologies such stacking the dies side-by-side on an interposer, using a stacked-die architecture where the IC is implemented as a Multi-Chip Module (MCM), or the like. In the multi-die IC example, it should be appreciated that each die may include single subsystem, two or more subsystems, a subsystem and another partial subsystem, or any combination thereof.

A programmable integrated circuit (IC) refers to a type of device that includes programmable logic. An example of a programmable device or IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs). Modern programmable ICs have evolved to include programmable logic in combination with one or more other subsystems. For example, some programmable ICs have evolved into System-on-Chips or "SOCs" that include both programmable logic and a hardwired processor. Other varieties of programmable ICs include additional and/or different subsystems.

Although various embodiments have been described with reference to the figures, other embodiments are possible. For example, memory 330 arranged in the VCE 210 may be placed in the modified CORDIC engine 200. In some embodiments, the floating point register 230 may be coupled to the VCE 210 the store the second data set 215.

Various examples may be implemented using circuitry, including various electronic hardware. By way of example and not limitation, the hardware may include transistors, resistors, capacitors, switches, integrated circuits and/or other devices. In various examples, the circuits may include analog and/or digital logic, discrete components, traces and/or memory circuits fabricated on a silicon substrate including various integrated circuits (e.g., FPGAs, ASICs). In some embodiments, the circuits may involve execution of preprogrammed instructions and/or software executed by a processor. For example, various systems may involve both hardware and software.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a fixed hardware processor; and methods can be performed by a programmable processor executing a program of instructions to perform functions of various embodiments by operating on input data and generating an output. Some embodiments may be implemented advantageously in one or more computer programs that are executable on a programmable system including at least one processor coupled to receive data and instructions from, and to transmit data and instructions to, a data store, at least one input, and/or at least one output. A data store may include one or more registers or memory locations in, for example, a memory space. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A system comprising:
a first circuit configured to receive an input vector V representative of a first data set and transform each element $V_i$ of the input vector V into $V_i = V_{pi} + k_i \cdot \ln 2$ to generate a second data set, the second data set comprising a first sub data set that has $V_{pi}$ and a second sub data set that has $k_i$, wherein $-1 \leq V_{pi} \leq 1$, and each $k_i$ is an integer;
a second circuit configured to receive the second data set from the first circuit and perform first exponential calculations on the second data set to generate a third data set, the third data set comprising a third sub data set that has a first mantissa $$V_{total1} = \frac{\sum_{j=1}^{n} 2^{k_j} \cdot f_{exp}(V_{pj})}{2^{k_{total}}}$$

and a fourth sub data set having a first exponent $k_{total}$, wherein $-1 \leq V_{total1} \leq 1$,
a third circuit configured to receive the third sub data set and perform logarithm calculations on the third sub data set to generate a fifth sub data set that has a second mantissa $$V_{total2} = 2f_{ln}\left(\frac{\sum_{j=1}^{n} 2^{k_j} \cdot f_{exp}(V_{pj})}{2^{k_{total}}}\right),$$

wherein $-1 \leq V_{total2} \leq 1$; and
a fourth circuit configured to receive the fourth sub data set that has the first exponent $k_{total}$, the fifth sub data set that has the second mantissa, and the second data set that has $V_{pi}$ and $k_i$, and perform second exponential calculations to generate an output data set that has $$2^{k_i - k_{total}} \cdot f_{exp}(V_{pi}) + 2f_{ln}\left(\frac{\sum_{j=1}^{n} 2^{k_j} \cdot f_{exp}(V_{pj})}{2^{k_{total}}}\right),$$

wherein the output data set is representative of a probability distribution of each element $V_i$ of the input vector V.

2. The system of claim 1, wherein the first circuit comprises:
a demultiplexer configured to receive each element $V_i$ of the input vector V representative of the first data set;
$K_{int}$ transformation circuits commonly coupled to the output of the demultiplexer to perform sequential subtraction of value ln2 to an absolute value of element $V_i$;
$K_{int}$ casting circuits, each casting circuit of the $K_{int}$ casting circuits is coupled to a transformation circuit of the $K_{int}$ transformation circuits; and
a multiplexer coupled to receive outputs from the $K_{int}$ transformation circuits and outputs from the $K_{int}$ casting circuits to generate the first sub data set that has $V_{pi}$ and the second sub data set that has $k_i$.

3. The system of claim 2, wherein the first circuit further comprises: a data store configured to store the first sub data set that has $V_{pi}$ and the second sub data set that has $k_i$.

4. The system of claim 1, wherein the second circuit comprises:
a first N-stage pipelined CORDIC circuit configured to receive the first sub data set that has $V_{pi}$ and perform the first exponential calculations on the first sub data set that has $V_{pi}$ to generate a sixth sub data set that has $f_{exp}(V_{pi})$;
a delay circuit configured to introduce a delay on the second sub data set that has $k_i$ to match a delay introduced by the first N-stage pipelined CORDIC circuit; and
a state machine coupled to the first N-stage pipelined CORDIC circuit and the delay circuit to perform operations on the sixth sub data set to make an integer part of $f_{exp}(V_{pi}) \leq 1$.

5. The system of claim 4, wherein the operations further comprise:
if $f_{exp}(V_{pi}) > 1$, right shifting $f_{exp}(V_{pi})$ and increasing a corresponding $k_i$.

6. The system of claim 5, wherein the second circuit further comprises:
a floating point adder coupled to the state machine to perform summation on every $f_{exp}(V_{pi})$; and
a floating point register coupled to the floating point adder to generate and store the third sub data set and the fourth sub data set.

7. The system of claim 6, wherein the third circuit comprises:
a second N-stage pipelined CORDIC circuit coupled to the floating point register to receive the third sub data set that has the first mantissa $$V_{total1} = \frac{\sum_{j=1}^{n} 2^{kj} \cdot f_{exp}(V_{pj})}{2^{k_{total}}}$$

and perform the logarithm calculations on the third sub data set that has the first mantissa $V_{total1}$ to generate the fifth sub data set that has the second mantissa $$V_{total2} = 2f_{ln}\left(\frac{\sum_{j=1}^{n} 2^{kj} \cdot f_{exp}(V_{pj})}{2^{k_{total}}}\right).$$

8. The system of claim 7, wherein the fourth circuit comprises:
a summing circuit configured to retrieve the first sub data set that has $V_{pi}$ from a data store and retrieve the fifth sub data set that has the second mantissa $V_{total2}$ from the floating point register and generate a seventh sub data set;
a subtracting circuit configured to retrieve the second sub data set that has $k_i$ from memory and retrieve the fourth data set that has the first exponent $K_{total}$ from the floating point register and subtract the first exponent $K_{total}$ from $k_i$ to generate an eighth sub data set;
a N-stage pipelined CORDIC circuit coupled to the output of the summing circuit and configured to perform the second exponential calculations on the seventh sub data set to generate a ninth sub data set that has $$f_{exp}\left(V_{pi} + 2f_{ln}\left(\frac{\sum_{j=1}^{n} 2^{kj} \cdot f_{exp}(V_{pj})}{2^{k_{total}}}\right)\right);$$

a second delay path configured to introduce a delay on the received eighth sub data set; and
a state machine coupled to the N-stage pipelined CORDIC circuit and the delay path to perform operations on the ninth sub data set to make an integer part of $$f_{exp}\left(V_{pi} + 2f_{ln}\left(\frac{\sum_{j=1}^{n} 2^{kj} \cdot f_{exp}(V_{pj})}{2^{k_{total}}}\right)\right)$$

≤1 and generate the output data set.

9. A method comprising:
(a) receiving, at a first circuit, an input vector V representative of a first data set and transforming each element $V_i$ of the input vector V into $V_i = V_{pi} + k_i \cdot \ln 2$ to generate a second data set, the second data set comprising a first sub data set that has $V_{pi}$ and a second sub data set that has $k_i$, wherein $-1 \le V_{pi} \le 1$, and $k_i$ is an integer;

(b) receiving, at a second circuit, the second data set and performing first exponential calculations on the second data set to generate a third data set, the third data set comprising a third sub data set that has a first mantissa $$V_{total1} = \frac{\sum_{j=1}^{n} 2^{kj} \cdot f_{exp}(V_{pj})}{2^{k_{total}}}$$

and a fourth sub data set having a first exponent $k_{total}$, wherein $-1 \le V_{total} \le 1$, (c) receiving, at a third circuit, the third sub data set and performing logarithm calculations on third sub data set to generate a fifth sub data set that has a second mantissa $$V_{total2} = 2f_{ln}\left(\frac{\sum_{j=1}^{n} 2^{kj} \cdot f_{exp}(V_{pj})}{2^{k_{total}}}\right);$$

and
(d) receiving, at a fourth circuit, the fourth sub data set that has the first exponent $k_{total}$, the fifth sub data set that has the second mantissa, and the second data set that has $V_{pi}$ and $k_i$, and performing second exponential calculations to generate an output data set that has $$2^{k_i - k_{total}} \cdot f_{exp}\left(V_{pi} + 2f_{ln}\left(\frac{\sum_{j=1}^{n} 2^{kj} \cdot f_{exp}(V_{pj})}{2^{k_{total}}}\right)\right),$$

wherein the output data set is representative of a probability distribution of each element $V_i$ of the input vector V.

10. The method of claim 9, further comprising:
(a1) receiving each element $V_i$ of the input vector V representative of the first data set; and
(a2) performing sequential subtraction of value ln2 to an absolute value of element $V_i$.

11. The method of claim 10, further comprising:
(b1) performing the first exponential calculations on the first sub data set that has $V_{pi}$ to generate a sixth sub data set that has $f_{exp}(V_{pi})$; and
(b2) if $f_{exp}(V_{pi}) > 1$, right shifting $f_{exp}(V_{pi})$ and increasing a corresponding $k_i$ to make an integer part of $f_{exp}(V_{pi}) \le 1$.

12. The method of claim 11, further comprising:
(b3) performing summation on every $f_{exp}(V_{pi})$; and
(b4) generating and storing the third sub data set and the fourth sub data set.

13. The method of claim 12, further comprising:
(c1) retrieving the third sub data set that has the first mantissa $$V_{total1} = \frac{\sum_{j=1}^{n} 2^{kj} \cdot f_{exp}(V_{pj})}{2^{k_{total}}}$$

and performing the logarithm calculations on the third sub data set that has the first mantissa $V_{total1}$ to generate the fifth sub data set that has the second mantissa $$V_{total2} = 2f_{ln}\left(\frac{\sum_{j=1}^{n} 2^{kj} \cdot f_{exp}(V_{pj})}{2^{k_{total}}}\right).$$

* * * * *